(12) United States Patent
Zhang et al.

(10) Patent No.: US 11,240,180 B2
(45) Date of Patent: Feb. 1, 2022

(54) MESSAGE PROVIDING DEVICE AND NON-TRANSITORY COMPUTER READABLE MEDIUM

(71) Applicant: FUJIFILM BUSINESS INNOVATION CORP., Tokyo (JP)

(72) Inventors: Xiaojing Zhang, Kanagawa (JP); Shigeo Miyata, Kanagawa (JP); Hiroyuki Mitsuhashi, Kanagawa (JP); Yu Mishima, Kanagawa (JP); Hideaki Sugimoto, Kanagawa (JP); Shiori Oikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 252 days.

(21) Appl. No.: 16/294,328

(22) Filed: Mar. 6, 2019

(65) Prior Publication Data

US 2019/0297032 A1    Sep. 26, 2019

(30) Foreign Application Priority Data

Mar. 20, 2018 (JP) .............................. JP2018-051875
Mar. 20, 2018 (JP) .............................. JP2018-052685

(51) Int. Cl.
*H04L 12/58* (2006.01)
*G06F 9/54* (2006.01)
(Continued)

(52) U.S. Cl.
CPC .............. *H04L 51/02* (2013.01); *G06F 9/546* (2013.01); *H04L 41/026* (2013.01); *H04L 41/08* (2013.01);
(Continued)

(58) Field of Classification Search
CPC ......... H04L 51/02; H04L 51/04; H04L 51/26; H04L 51/0265; G06F 3/1253; G06F 3/1204; G06F 51/24; G06F 51/18
See application file for complete search history.

(56) References Cited

U.S. PATENT DOCUMENTS

2003/0220972 A1* 11/2003 Montet .................. H04L 51/04
                                                        709/204
2014/0244769 A1    8/2014 Sakuta et al.
(Continued)

FOREIGN PATENT DOCUMENTS

JP           2014-164522 A      9/2014

*Primary Examiner* — Sargon N Nano
(74) *Attorney, Agent, or Firm* — Oliff PLC

(57) ABSTRACT

A message providing device includes: a receiver; and a controller. At least first and second operation modes are operations of a software robot program. The program operates on a service exchanging messages between users. In the first mode, a specific service is executed upon reception of a message or a sticker. In the second mode, the specific service is not executed even if the message or the sticker is received. The receiver receives the message or the sticker from the user. When the received message is a first specific message or the received sticker is a first specific sticker, the controller switches the first mode to the second. When the received message is a second specific message different from the first or the received sticker is a second specific sticker which is different from the first, the controller switches the second mode to the first.

11 Claims, 23 Drawing Sheets

(51) Int. Cl.
*H04L 12/24* (2006.01)
*H04L 29/06* (2006.01)

(52) U.S. Cl.
CPC ............ *H04L 51/046* (2013.01); *H04L 51/18* (2013.01); *H04L 51/24* (2013.01); *H04L 63/10* (2013.01)

(56) References Cited

U.S. PATENT DOCUMENTS

| | | | |
|---|---|---|---|
| 2015/0172505 A1* | 6/2015 | Park | H04N 1/00307 358/1.15 |
| 2018/0083894 A1* | 3/2018 | Fung | H04L 51/046 |
| 2018/0083898 A1* | 3/2018 | Pham | H04L 51/02 |
| 2019/0171845 A1* | 6/2019 | Dotan-Cohen | H04L 63/102 |
| 2019/0258431 A1* | 8/2019 | Yamamoto | G06F 3/1222 |
| 2019/0314995 A1* | 10/2019 | Wang | G05B 19/408 |
| 2019/0384554 A1* | 12/2019 | Dellagnolo | G06F 3/1205 |
| 2021/0042064 A1* | 2/2021 | Ando | G06F 3/1238 |
| 2021/0165621 A1* | 6/2021 | Saito | G06F 3/1285 |

* cited by examiner

|  | USER | PRINTER | COLOR | SIZE | NUMBER OF COPIES |
|---|---|---|---|---|---|
| 001 | USER A | PRINTER A | COLOR | A4 | 1 |
| 002 | USER B | PRINTER B | BLACK AND WHITE | LETTER | 2 |
| ... |  |  |  |  |  |

MESSAGE PROVIDING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-052685 filed Mar. 20, 2018 and Japanese Patent Application No. 2018-051875 Mar. 20, 2018.

BACKGROUND

(i) Technical Field

The present invention relates to a message providing device and a non-transitory computer readable medium.

(ii) Related Art

JP-A-2014-164522 describes a message notification device that notifies a message which reports a result of an operation instruction from a user while explicitly indicating a destination of the message. An operation instruction detection unit detects the operation instruction from the message and also specifies a member who posts the message as an instructor. A report message display unit displays a message about the result of the operation that has been performed in accordance with the operation instruction on a family electronic message board in a state in which the instructor is explicitly shown as a destination.

SUMMARY

Except a case where a single user exchanges messages with a chatbot, when plural users and a chatbot form a group to perform a group chat, it is not desirable that the chatbot automatically responds to the messages exchanged among the plural users and provide a service without complying with the user's intention.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a message providing device including: a receiver; and a controller, wherein at least a first operation mode and a second operation mode are provided as operations of a software robot program, the software robot program operating on a messaging service in which a message is exchanged between users, the software robot program exchanging a message with a user, in the first operation mode, a specific service is executed upon reception of a message or a sticker, in the second operation mode, the specific service is not executed even if the message or the sticker is received, the receiver receives the message or the sticker from the user, when the received message is a first specific message or the received sticker is a first specific sticker, the controller switches the first operation mode to the second operation mode, and when the received message is a second specific message which is different from the first specific message or the received sticker is a second specific sticker which is different from the first specific sticker, the controller switches the second operation mode to the first operation mode.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described based on the accompanying drawings. Particularly, a chatbot that provides a printing service in accordance with a message from a user will be described as an example.

First Exemplary Embodiment

Figure 1:
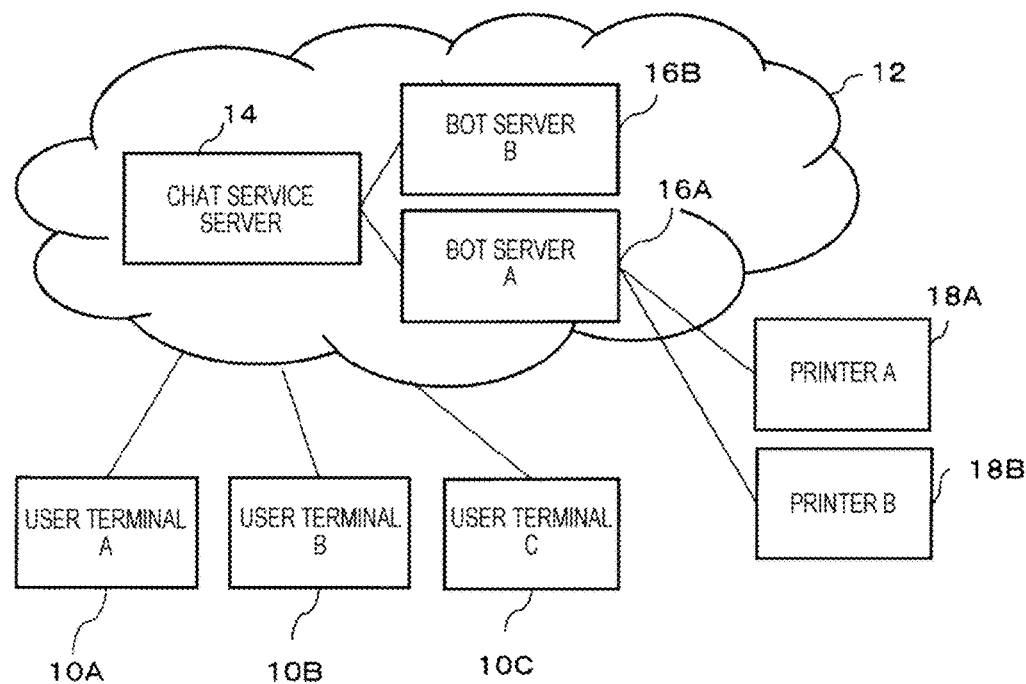
FIG. 1 is a system configuration diagram according to a first exemplary embodiment.

FIG. 1 illustrates an overall configuration diagram of a messaging service system according to an exemplary embodiment. The messaging service system includes a user terminal A (10A) to a user terminal C (10C), a chat service server 14, a bot server A (16A) to a bot server B (16B), and a printer A (18A) to a printer B (18B).

The user terminal A (10A) to the user terminal C (10C) are terminals used by users of a messaging service. The user terminal A (10A) to the user terminal C (10C) are information terminals such as a smartphone, a tablet terminal, and a personal computer (PC). In FIG. 1, the three user terminals, that is, the user terminal A (10A), the user terminal B (10B), and the user terminal C (10C) are illustrated. It should be noted that any number of user terminal may be provided. The users operate the user terminal A (10A) to the user terminal C (10C) to access the chat service server 14 on a cloud 12, and exchange messages with other users and chatbots. Hereinafter, it is assumed that a user A operates the user terminal A, that a user B operates the user terminal B, and that a user C operates user terminal C. The user terminal A (10A) to the user terminal C (10C) and the chat service server 14 are connected to each other via a wired or wireless communication network so as to transmit and receive data. An example of the communication network is a public line such as the Internet. The communication network may be a dedicated line.

The chat service server 14 is, for example, a cloud server disposed on the cloud 12, and is a server that provides a chat service. The chat service server 14 includes one or plural server computers. The chat service server 14 performs overall processes related to message exchanging, such as transmitting and receiving messages to and from the user terminal A to the user terminal C, and displaying a screen for transmission and reception of messages. In addition to processing the exchange of messages between two users, the chat service server 14 may form a group of three or more users and process the exchange of messages in the group (group chat). The chat service server 14 also processes the exchange of messages with chatbots provided by the bot server A (16A) and the bot server B (16B), in cooperation with the bot servers 16A and 16B. The exchange of messages between users and a chatbot includes the exchange of messages between a user and a chatbot, and the exchange of messages among plural users and a chatbot.

The bot server A (16A) and the bot server B (16B) function as message providing devices according to the present exemplary embodiment. Chatbot software robot programs that exchange messages with users are installed in the bot server A (16A) and the bot server B (16B). The bot server A (16A) and the bot server B (16B) execute the programs. The bot server A (16A) and the bot server B (16B) may be operated by messenger service accounts of a company or a store assigned for an advertisement purpose or a commercial purpose. The bot server A (16A) and the bot server B (16B) cooperate with the chat service server 14 via a specific application programming interface (API), exchange messages with the users, and automatically respond to messages from the users to send reply messages. The specific API is an API for using the chat service server 14. The format of the API may be any form. For example, the API is in the format of Javascript object notation (JSON). The API sends JSON data in the specified format to a specific URL of the chat service server 14 by POST or GET, and a result is returned as data in the JSON format.

When a message from the user includes an operation instruction, the bot server A (16A) and the bot server B (16B) execute specific service contents in accordance with the operation instruction. In the present exemplary embodiment, the bot server A (16A) serves as a "print bot" that, when the message from the user includes a printing instruction, operates the printer A (18A) or the printer B (18B) in accordance with the printing instruction to perform a printing process. On the other hand, the bot server 16B may provide any service in accordance with an operation instruction from the user. In FIG. 1, the two bot servers, that is, the bot server A (16A) and the bot server B (18B) are illustrated. It should be noted that any number of bot servers may be provided. Plural chatbots may be implemented by a single bot server. Alternatively, a single chatbot may be implemented by plural bot servers.

The bot server A serving as a chatbot (or a print bot) executes a printing process by driving the printer A or the printer B according to setting information about an operation of a software robot program which is registered for each user in advance. The setting information may be an operation condition for operating the printer A or the printer B. The user A operates the user terminal A to input and register the setting information for operating the printer A. The user B operates the user terminal B to input and register the setting information for operating the printer B.

The printer A (18A) and the printer B (18B) execute an image printing process in accordance with a command from the bot server A.

Figure 2:
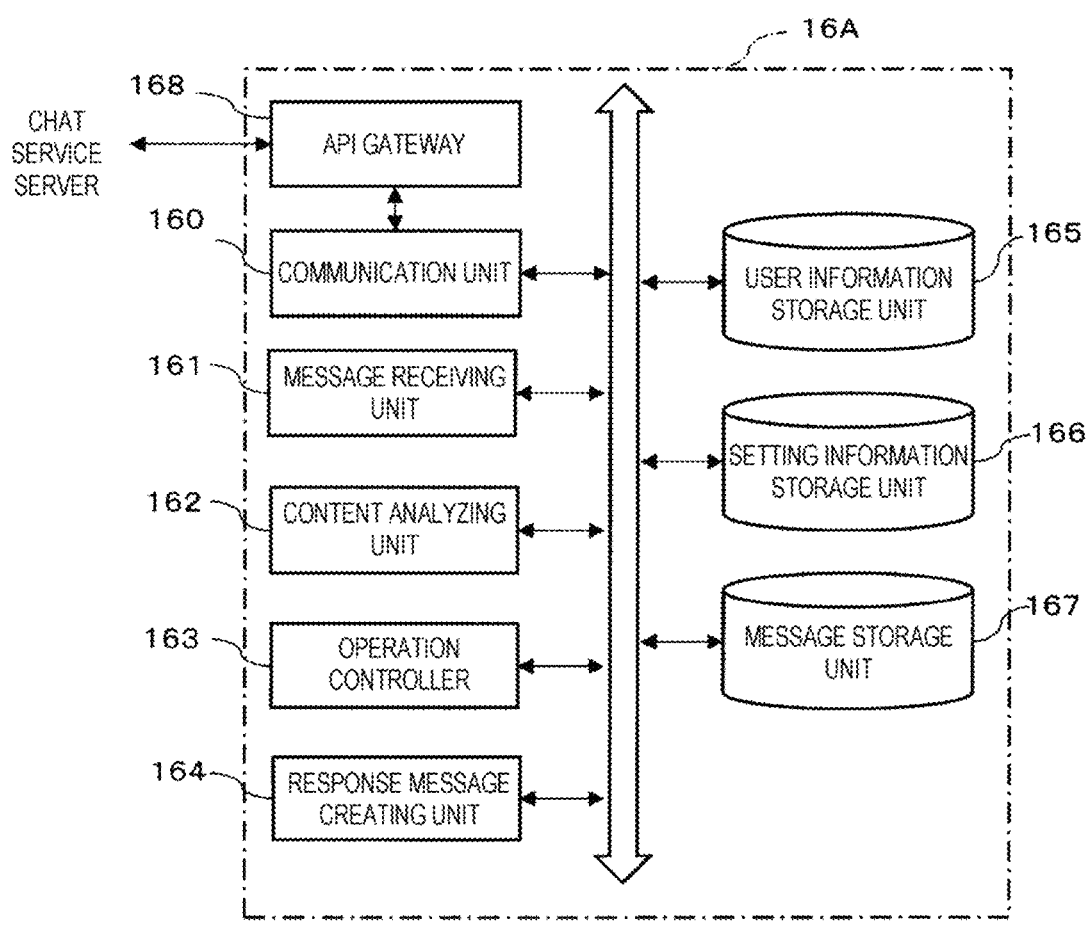
FIG. 2 is a functional block diagram according to the first exemplary embodiment.

FIG. 2 is a functional block diagram of the bot server A (16A). The bot server A includes, as functional blocks, a communication unit 160, a message receiving unit 161, a content analyzing unit 162, an operation controller 163, a response message creating unit 164, a user information storage unit 165, a setting information storage unit 166, a message storage unit 167, and an API gateway 168.

The communication unit 160 communicates with the chat service server 14 and the printers A and B. The communication unit 160 communicates with the chat service server 14 via the API gateway 168 to exchange messages. The communication unit 160 outputs the messages received from the chat service server 14 via the API gateway 168, that is, the messages from the user terminal A to the user terminal C, to the message receiving unit 161. In addition, the communication unit 160 transmits a response message created by the response message creating unit 164 to the chat service server 14 via the API gateway 168 (that is, transmits the response message to the user terminal A to the user terminal C). The communication unit 160 also outputs a printing command to the printer A and the printer B according to a command from the operation controller 163, to drive the printers A and B.

The message receiving unit 161 serves as a receiving unit. The message receiving unit 161 receives the message from the communication unit 160 and output the message to the content analyzing unit 162. The message includes a message related to the registration of the setting information. The message receiving unit 161 sequentially stores the received messages in the message storage unit 167.

The content analyzing unit 162 analyzes the contents of the received message and outputs the analysis result to the operation controller 163. Specifically, the content analyzing unit 162 recognizes a user identifier (user ID) included in the received message, extracts a text portion included in the message, and executes a syntax analysis of the text portion. The syntax analysis method may be any method. For example, the input message is decomposed into morpheme units, and then nouns, adjectives, verbs, and interrogative pronouns are extracted as keywords. When an operation instruction is included in the text portion of the message, the content analyzing unit 162 analyzes the contents of the operation instruction and outputs the analysis result to the operation controller 163. The operation instruction in the present exemplary embodiment may include printing instructions for printers A and B or instructions for the setting information of the printers A and B.

The operation controller 163 serves as a controller. The operation controller 163 registers setting information about the operations of the printers A and B in the setting information storage unit 166 based on the analysis result obtained by the content analyzing unit 162. In addition, the operation controller 163 outputs a printing command to the printers A and B in response to the message from the user. In this case, the operation controller 163 switches an operation mode in accordance with a specific message from the user or the like. The operation modes includes a first mode and a second mode. In the first mode, the message from the user is automatically responded to and the printing service is executed, while in the second mode, the printing service is not executed.

The response message creating unit 164 creates a response message in accordance with the analysis result obtained by the content analyzing unit 162, and transmits the response message to the chat service server 14 via the communication unit 160.

The user information storage unit 165 stores information of the user who uses the chat service server 14, in particular, information of the user who uses the chatbot implemented by the bot server A, as a user information table. A specific account is allocated to the chatbot on the chat service implemented by the chat service server 14. When a user designates this account and performs a specific operation so that the chatbot becomes available to the user or the user obtains a chatbot use authority (hereinafter, this will be referred to as "add as a friend"), the use of the chatbot is established. The user information is, for example, the user ID. The user information storage unit 165 may store information about an authority of each user.

The setting information storage unit 166 stores the setting information for each of the users who use the chatbot implemented by bot server A, as a table. Items of the setting information include identification information of a printer to be used, a color mode, a paper size, the number of copies, and the like. It should be noted that the items of the setting information are not limited to the above examples. As will be described later, the setting information may be determined in accordance with the contents of the service provided by the bot server A. In the case of the printing service, the setting information relates to printing. In the case of a searching service, the setting information relates to search conditions. The setting information is information defining the contents of the service. The setting information may include plural items.

The message storage unit 167 stores the messages from the user received by the message receiving unit 161 as a history.

Figure 3:
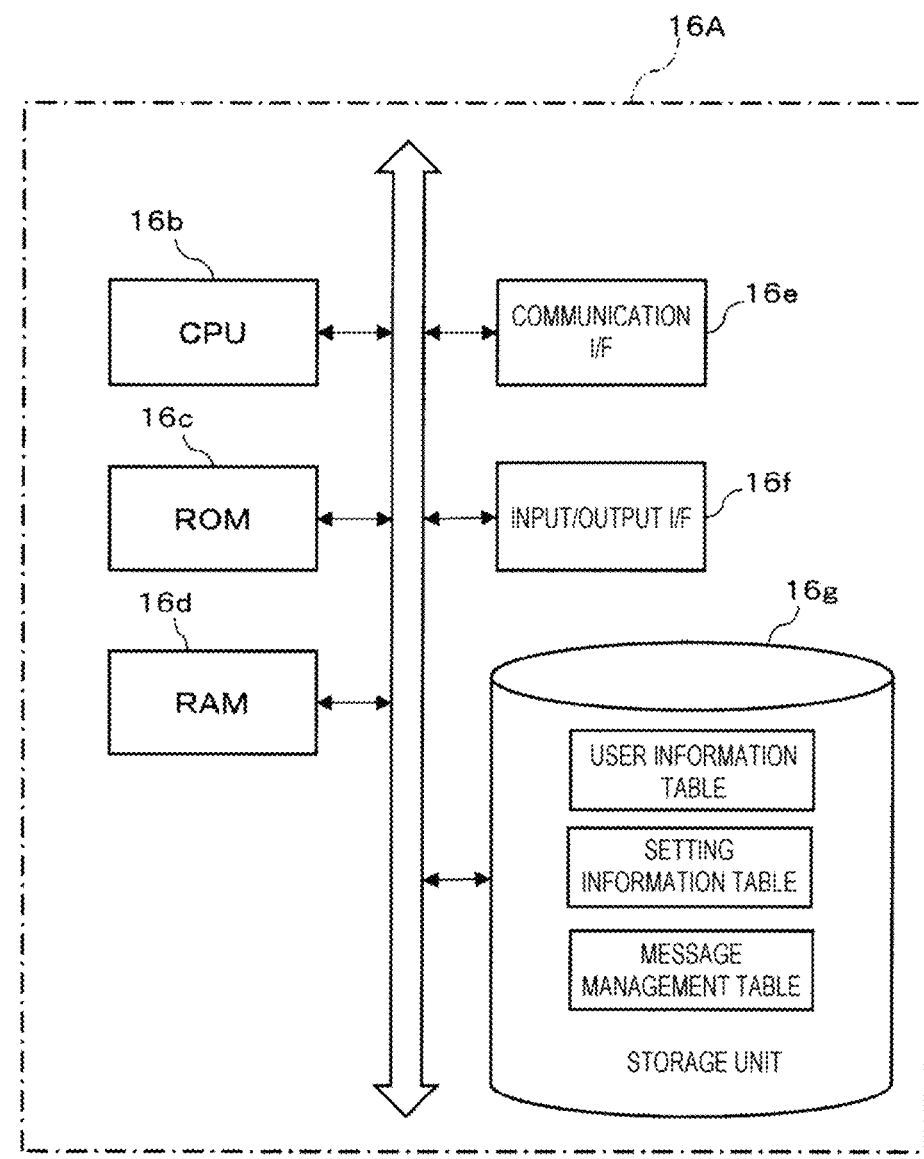
FIG. 3 is a configuration block diagram according to the first exemplary embodiment.

FIG. 3 illustrates a configuration block diagram of the bot server A. The bot server A is implemented by one or plural server computers. The bot server A includes one or plural CPUs 16b, a ROM 16c, a RAM 16d, a communication interface (I/F) 16e, an input/output I/F 16f, and a storage device 16g.

The one or plural CPUs 16b read a bot application stored in the ROM 16c or the storage device 16g, and implement the function of the chatbot using the RAM 16d as a working memory. That is, the one or plural CPUs 16b automatically respond to the message from the user. When the operation instruction is included in the message from the user, the one or plural CPUs 16b drive the printers A and B in accordance with the operation instruction. The CPU 16b implements the message receiving unit 161, the content analyzing unit 162, the operation controller 163, the response message creating unit 164, and the API gateway 168 illustrated in FIG. 2, by executing the bot application.

The communication I/F 16e outputs a printing command to the printers A and B while exchanging a message with the chat service server 14.

The input/output I/F 16f transmits and receives data to and from an input device such as a keyboard and a mouse, and an output device such as a display device.

The storage device 16g is configured with a nonvolatile memory such as a hard disk drive (HDD) and a solid state drive (SSD). The storage device 16g stores the user information table, the setting information table, and the message management table in addition to storing the bot application. The storage device 16g implements the user information storage unit 165, the setting information storage unit 166, and the message storage unit 167 illustrated in FIG. 2.

In the present exemplary embodiment, the CPU executes the software robot program to implement the chatbot. Alternatively, a part of the chatbot may be implemented by hardware processing instead of processing achieved by the execution of a program. The hardware processing may be implemented by a circuit such as an ASIC or a field programmable gate array (FPGA).

Next, registration of the setting information will be described by taking the user A and the user B as an example.

Figures 4, 5:
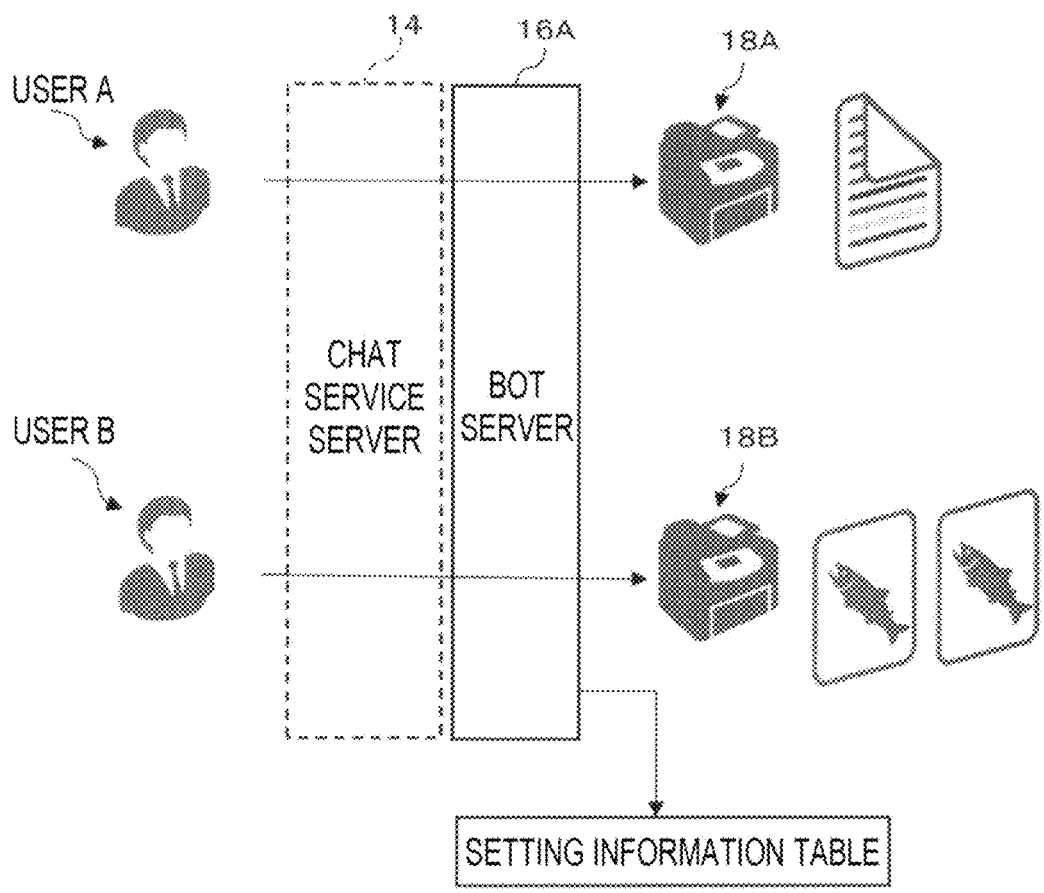
FIG. 4 is an explanatory diagram of setting information registration according to the first exemplary embodiment.
FIG. 5 is an explanatory diagram of a setting information table.

FIG. 4 schematically illustrates a setting registration process by the user A and the user B.

When the user A and the user B add a chatbot to which a specific account is allocated on the chat service as a friend, the bot server A (16A) allocates user identifiers (user IDs) to the user A and the user B, respectively, and allocates printer identifiers (printer IDs) for unique identification to the printer A and the printer B, respectively, as well. The accounts of the users A and B on the chat service may be used as the user IDs as they are.

Subsequently, the user A transmits a message to the bot server A (16A) via the chat service server 14, specifies the printer A or the printer B, and registers the setting information. For example, the user A specifies the printer A and then, transmits messages designating the followings as the setting information.

Color mode: color
Paper size: A4
Number of copies: 1

When receiving the messages, the bot server A analyzes the contents of the messages. When interpreting the messages as the setting information, the bot server A associates the user A and the printer A with each other and then, records the setting information in the setting information table.

This is the same for the user B. The user B transmits a message to the bot server A (16A) via the chat service server 14, specifies the printer A or the printer B, and then, registers the setting information. For example, the user B specifies the printer B, and then transmits messages designating the followings as the setting information.

Color mode: black and white
Paper size: letter
Number of copies: 2

When receiving the messages, the bot server A analyzes the contents of the messages. When interpreting the messages as the setting information, the bot server A associates the user B and the printer B with each other and then, records the setting information in the setting information table.

FIG. 5 illustrates an example of the setting information table stored in the setting information storage unit 166. The printer, the color (color mode), the size (paper size), and the number of copies are recorded in association with each user. More specifically, the identification information, the color (color mode), the size (paper size), and the number of copies of a printer are recorded in association with the identification information of each user.

In this manner, the user A or the user B may register a printer and the setting information by adding the chatbot as a friend, and execute the printing service with a desired printer and desired printing conditions by transmitting a message such as "print" to the chatbot.

In the meantime, when the user A and the user B form the same group and is performing a group chat, the user A may causes the chatbot, which the user A has added as a friend, to join the group chat. The user A and the user B may appropriately issue a printing instruction to the chatbot to execute the printing service while enjoying a chat. However, in some cases, the chatbot may automatically respond to the chat between the user A and the user B, and execute the printing service without complying with the intention of the user A or the user B.

Therefore, in the present exemplary embodiment, the first mode and the second mode are provided as the operation modes of the chatbot. The first mode is a mode in which the printing service is executed. The second mode is a mode in which the printing service is not executed. By dynamically switching between the two modes, it is possible to prevent the execution of unnecessary printing services that do not follow the intention of the user A or the user B.

Figure 6:
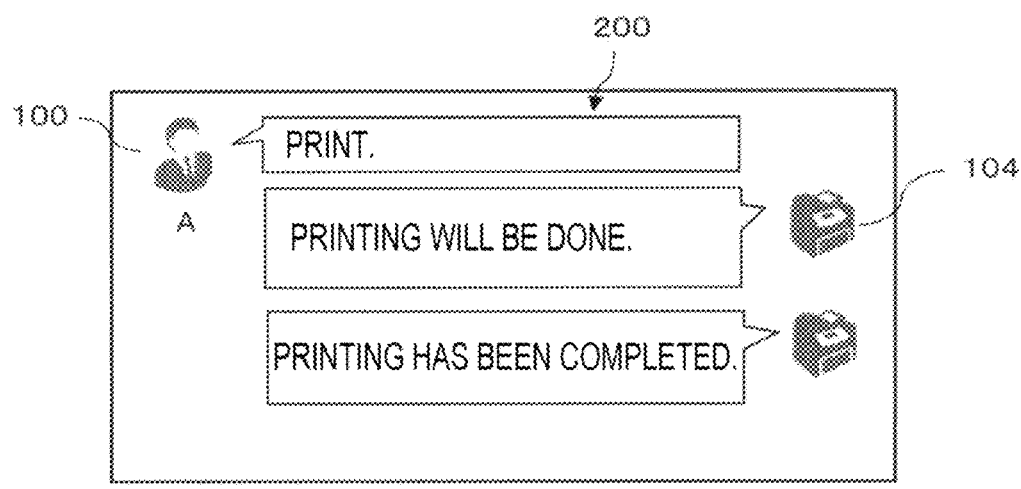
FIG. 6 is an explanatory diagram of a user terminal screen according to the first exemplary embodiment.

FIG. 6 illustrates an example of a screen displayed on a display unit of the user terminal A when only the user A exchanges messages with the chatbot. The chat service server 14 displays, on the screen of the user terminal A, a visual representation figure (icon) 100 representing the user A and an icon 104 representing the chatbot. Further, messages 200 of the user A and the chatbot are displayed in time-series from top to bottom.

The user A operates the user terminal A to transmit a message "Print" to the chatbot. The user A also attaches image data to be printed along with the message. The user A may only transmit the image data instead of the message.

The chatbot that receives the message analyzes the contents of the message and interprets the contents of the message as a printing instruction, creates a message that "Printing will be done." to make an automatic response, and drives the printer A or the printer B in accordance with the setting information of the user A to execute the printing service. When the printing is completed, the chat bot creates a message that "Printing has been completed." to make an automatic response.

In this manner, when only the user A exchanges messages with the chatbot, it is unlikely that the chatbot unnecessarily make an automatic response to the message and executes the printing service without complying with the intention of the user A.

Figure 7:
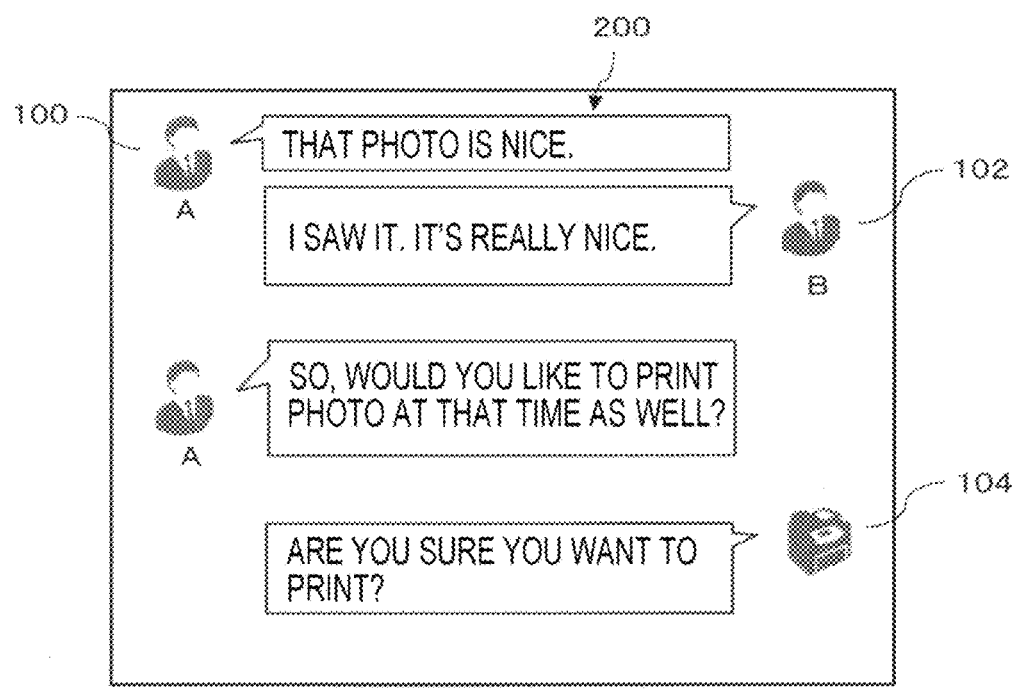
FIG. 7 is an explanatory diagram of a user terminal screen according to the first exemplary embodiment.

FIG. 7 illustrates an example of a screen displayed on the display unit of the user terminal A when the user A, the user B, and the chatbot exchange messages in a group chat. The icon 100 representing the user A, the icon 104 representing the chatbot, and an icon 102 representing the user B are displayed. Further, the messages 200 of the user A, the user B, and the chatbot are displayed in time-series from top to bottom.

The user A operates the user terminal A to transmit a message that "That photo is nice." The message is transmitted to all users who join the group chat (including the chatbot). Then, the user B who has viewed the message operates the user terminal B to transmit a message that "I saw it. It's really nice." This message is also transmitted to all users who join the group chat (including the chatbot). Then, the user A who has viewed this message transmits a message that "So, would you like to print photo at that time as well?" Since this message is also transmitted to all users who join the group chat (including the chatbot), the chatbot may extract a keyword "print" included in this message, create a message that "Are you sure you want to print?" and make an automatic response. The user A intends that the message is a message for the user B, and it is not desirable that the chatbot attempts to automatically respond to this message and execute the printing service even though he/she does not intend to print.

In addition, a chatbot may automatically respond to an image transmitted by a user and execute the printing service. It is also not desirable that the chat bot executes the printing service without complying with the user's intention and a billing process occurs.

In such a case, the user A or the user B temporarily restricts the operation of the chatbot by transmitting a specific message so that an unnecessary printing service is not executed.

Figure 8:
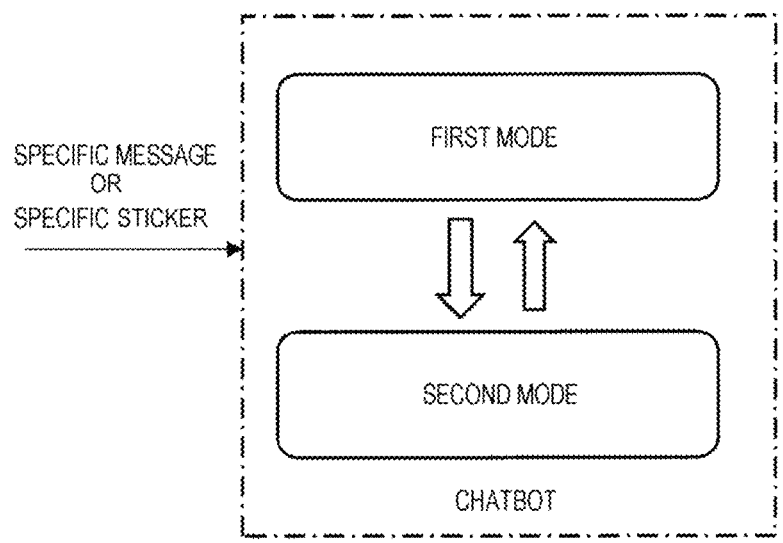
FIG. 8 is an explanatory diagram of mode switching according to the first exemplary embodiment.

FIG. 8 schematically illustrates switching of the operation mode of the chatbot. The chatbot has the first mode and the second mode as the operation modes. The first mode is a mode in which the user's message is received and the printing service is executed in response to the user's message. The second mode is a mode in which the user's message is received, but the printing service is not executed in response to the user's message.

The chatbot operates in the first mode at a time when the chatbot joins the group chat. When a specific message is received from the user, the operation mode is switched from the first mode to the second mode in accordance with the specific message. When the operation mode is switched to the second mode, the user's message is received, but the printing service is not executed in response to the user's message. Thus, execution of the printing service that does not follow the user's intention is prevented.

In addition, when the chatbot receives another specific message from the user while operating in the second mode, the operation mode is switched from the second mode to the first mode again in accordance with the specific message. When the operation mode is switched to the first mode, the user's message is received and the printing service is executed again in response to the user's message. It may be said that the chatbot switches from the first mode to the second mode in response to a first specific message, and switches from the second mode back to the first mode in response to a second specific message.

The operation mode may switch between the first mode and the second mode in response to reception of a specific sticker (or a specific mark) from the user rather than the specific message. The specific sticker may represent the contents of the specific message. Here, the chatbot may switch between the first mode and the second mode in accordance with an arbitrary instruction to the chatbot. Examples of the instruction to the chatbot may include an instruction in a state where the chatbot is selected and an instruction in a state where the chatbot is not selected. The instruction in a state where the chatbot is selected may be made by switching the mode after the chatbot is selected or by inviting a specific chatbot to a group chat. Examples of the instruction in a state where the chatbot is not selected may include transmission of a speech or a specific sticker (or a specific mark) in the group chat. The instruction in a state where the chatbot is not selected may be mode switching of a chatbot by an operation that does not designate the chatbot.

Figure 9:
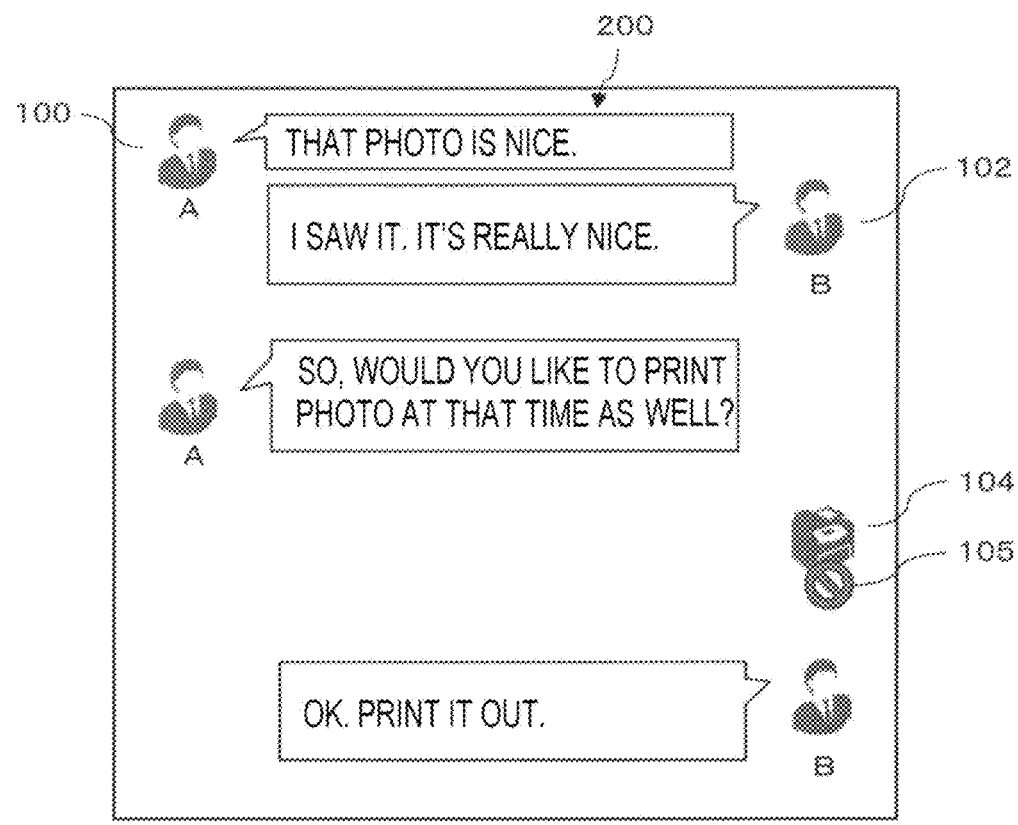
FIG. 9 is an explanatory diagram of a user terminal screen according to the first exemplary embodiment.

FIG. 9 illustrates an example of a screen displayed on the display unit of the user terminal A when the operation mode of the chatbot is switched from the first mode to the second mode.

The user A operates the user terminal A to transmit a message that "That photo is nice." The message is transmitted to all users who join the group chat (including the chatbot). Then, the user B who has viewed the message operates the user terminal B to transmit a message that "I saw it. It's really nice." This message is also transmitted to all users who join the group chat (including the chatbot). Then, the user A who has viewed this message transmits a message that "So, would you like to print photo at that time as well?" This message is also transmitted to all users who join the group chat (including the chatbot). The chatbot also receives this message, but operates in the second mode. Therefore, the chatbot does not extract a keyword "print" included in the message, create a message that "Are you sure you want to print?" and make an automatic response.

FIG. 9 illustrates that the icon 104 of the chatbot operating in the second mode is displayed together with an icon 105 representing an inactive state, which thus indicates that the chatbot operates in the second mode. It should be noted that the chatbot does not automatically respond to the message of the user A. Thus, the icons 104 and 105 may not be displayed.

In the meantime, the user B who has viewed the message from the user A may transmit a message "OK. Print it out." The message between the user A and the user B may be smoothly continued because the chatbot does not automatically respond unnecessarily.

Figure 10:
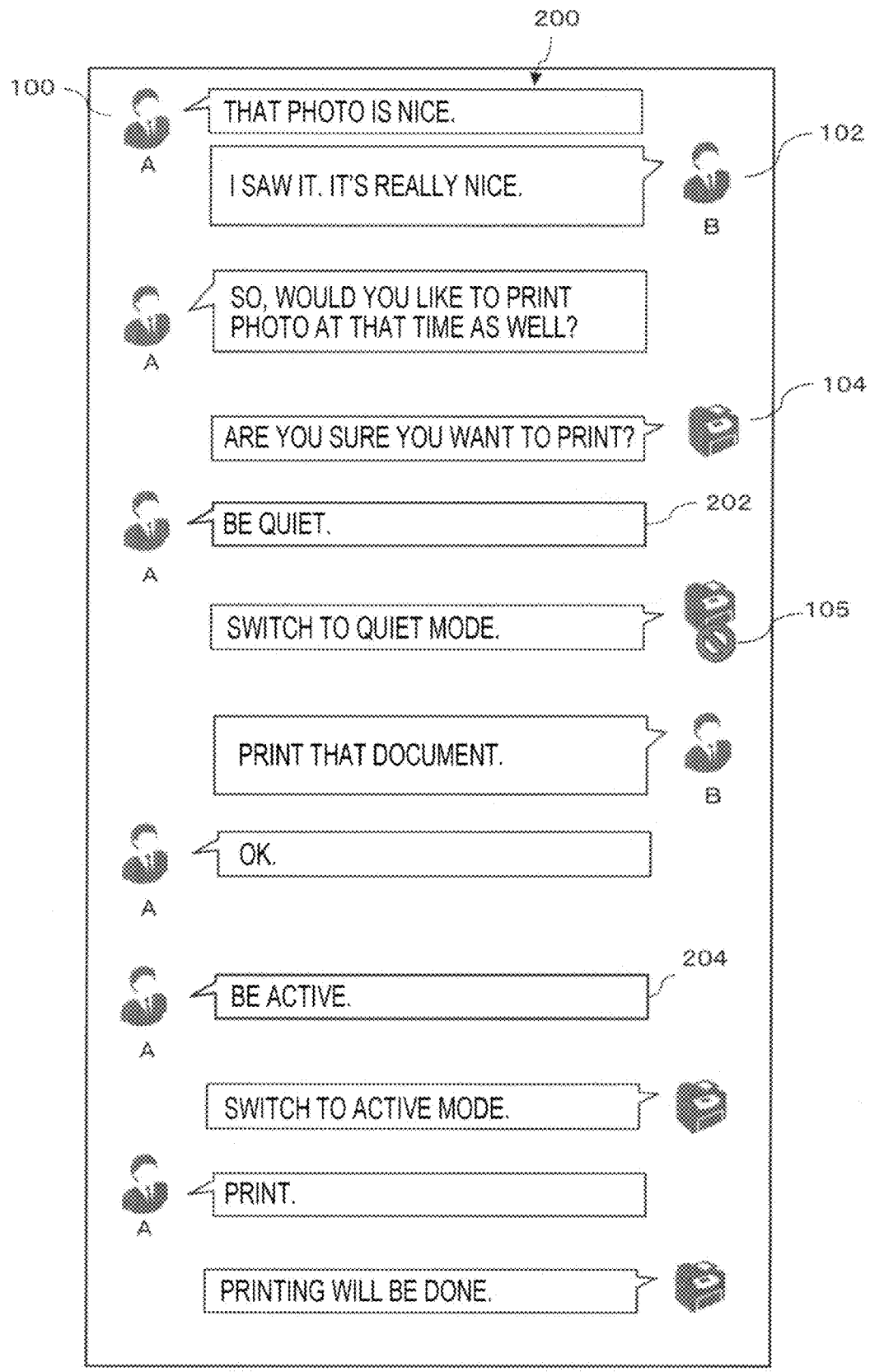
FIG. 10 is an explanatory diagram of a user terminal screen according to the first exemplary embodiment.

FIG. 10 illustrates an example of a screen displayed on the display unit of the user terminal A when the operation mode of the chatbot is sequentially switched from the first mode to the second mode and then to the first mode.

The user A operates the user terminal A to transmit a message that "That photo is nice." The message is transmitted to all users who join the group chat (including the chatbot). Then, the user B who has viewed the message operates the user terminal B to transmit a message that "I saw it. It's really nice." This message is also transmitted to all users who join the group chat (including the chatbot). Then, the user A who has viewed this message transmits a message that "So, would you like to print photo at that time as well?" This message is also transmitted to all users who join the group chat (including the chatbot). The chatbot also receives this message and operates in the first mode. Thus, the chatbot extracts the keyword "print" included in this message, creates a message that "Are you sure you want to print?" and makes an automatic response.

The user A who has viewed the message determines that the chatbot has responded unnecessarily, and transmits a specific message 202 that "Be quiet." The user A may designate a chatbot and transmit a message that "@chatbot Be quiet." Here, the message "@chatbot" indicates that the message (mention) is directed to the chatbot in the group chat. As a result, it is possible to restrict the chatbot that receives the message, and it is possible to switch only the mode of a specific chatbot when plural chatbots exist in a single group chat.

The chatbot that receives this specific message 202 analyzes the contents of the message. When the chatbot determines that the message 202 matches a specific message, the operation mode of the chatbot is switched from the first mode to the second mode. Then, the chatbot creates a message that "Switch to quiet mode." and make an automatic response. Here, the "quiet mode" indicates the second mode. In addition, a specific icon 105 is added to the icon 104 of the chatbot in response to switching from the first mode to the second mode. The user A and the user B may recognize that the operation mode of the chatbot has switched from the first mode to the second mode when viewing the message from the chatbot and the change of the icon.

Subsequently, the user B operates the user terminal B to transmit a message that "Print that document." The user A who has viewed this message transmits a message "OK." At this time, the message from the user B contains the keyword "print." However, the chatbot operates in the second mode. Therefore, the chatbot receives the message from the user B, but does not respond to this message.

The user A transmits a specific message 204 that "Be active" to bring the chatbot back to the first mode again.

The chatbot that receives this specific message 204 analyzes the contents of this message. When the chatbot determines that the message 204 matches a specific message, the operation mode of the chatbot is switched from the second mode to the first mode. Then, the chatbot a message that "Switch to active mode." and makes an automatic response. Here, the "active mode" indicates the first mode. In addition, the specific icon 105 added to the icon 104 of the chatbot disappears in response to switching from the second mode to the first mode. The user A and the user B may recognize that the operation mode of the chatbot has switched from the second mode to the first mode when viewing the message from the chatbot and the change of the icon.

Subsequently, when the user A transmits a message that "Print," the chatbot operating in the first mode creates a message that "Printing will be done," makes an automatic response and executes the printing service.

In this manner, the user may switch the chatbot from the first mode to the second mode by the first specific message 202 that "Be quiet," and switch the chatbot from the second mode to the first mode by the second specific message 204 that "Be active." That is, the operation mode of the chatbot may be controlled by the natural conversation (chat) of the user.

In FIG. 10, the operation mode of the chatbot is switched by a specific message from the user. Alternatively, the operation mode of the chatbot may be switched by a specific sticker from the user.

Figure 11:
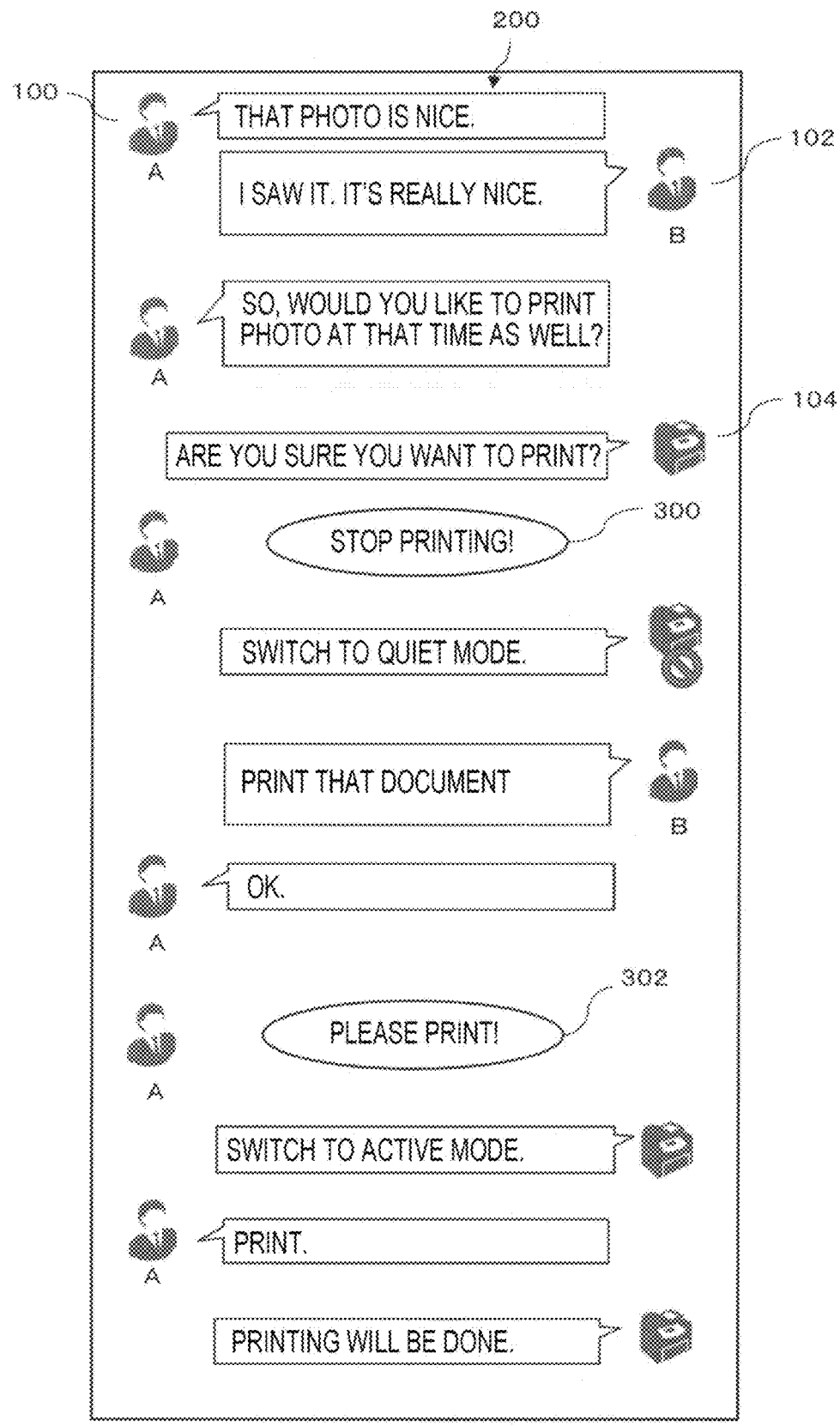
FIG. 11 is an explanatory diagram of a user terminal screen according to the first exemplary embodiment.

FIG. 11 illustrates an example of a screen displayed on the display unit of the user terminal A in this case.

The user A operates the user terminal A to transmit a message that "That photo is nice." The message is transmitted to all users who join the group chat (including the chatbot). Then, the user B who has viewed the message operates the user terminal B to transmit a message that "I saw it. It's really nice." This message is also transmitted to all users who join the group chat (including the chatbot). Then, the user A who has viewed this message transmits a message that "So, would you like to print photo at that time as well?" This message is also transmitted to all users who join the group chat (including the chatbot). The chatbot also receives this message and operates in the first mode. Thus, the chatbot extracts the keyword "print" included in this message, creates a message that "Are you sure you want to print?" and makes an automatic response.

The user A who has viewed this message determines that the chatbot has responded unnecessarily, and transmits a specific sticker 300 indicating that "Stop printing!" The specific sticker 300 may be a content that clarifies a mode switching, such as "Switch to quiet mode!"

The chatbot that receives this specific sticker 300 analyzes the contents of the sticker. When the chatbot determines that the sticker 300 matches a specific sticker, the chatbot switches from the first mode to the second mode. Then, the chatbot creates a message that "Switch to quiet mode." and make an automatic response. In addition, a specific icon 105 is added to the icon 104 of the chatbot in response to switching from the first mode to the second mode. The user A and the user B may recognize that the operation mode of the chatbot has switched from the first mode to the second mode when viewing the message from the chatbot and the change of the icon.

Subsequently, the user B operates the user terminal B to transmit a message that "Print that document." The user A who has viewed this message transmits a message "OK." At this time, the message from the user B contains the keyword "print." However, the chatbot operates in the second mode. Therefore, the chatbot receives the message from the user B, but does not respond to this message.

The user A transmits a specific sticker 302 indicating that "Please print!" to bring the chatbot back to the first mode again.

The chatbot that receives this specific sticker 302 analyzes the contents of the sticker. When the chatbot determines that the sticker 302 matches a specific sticker, the chatbot switches from the second mode to the first mode. Then, the chatbot a message that "Switch to active mode." and makes an automatic response. In addition, the specific icon 105 added to the icon 104 of the chatbot disappears in response to switching from the second mode to the first mode. The user A and the user B may recognize that the operation mode of the chatbot has switched from the second mode to the first mode when viewing the message from the chatbot and the change of the icon.

Subsequently, when the user A transmits a message that "Print," the chatbot operating in the first mode creates a message that "Printing will be done," makes an automatic response and executes the printing service.

Figure 12:
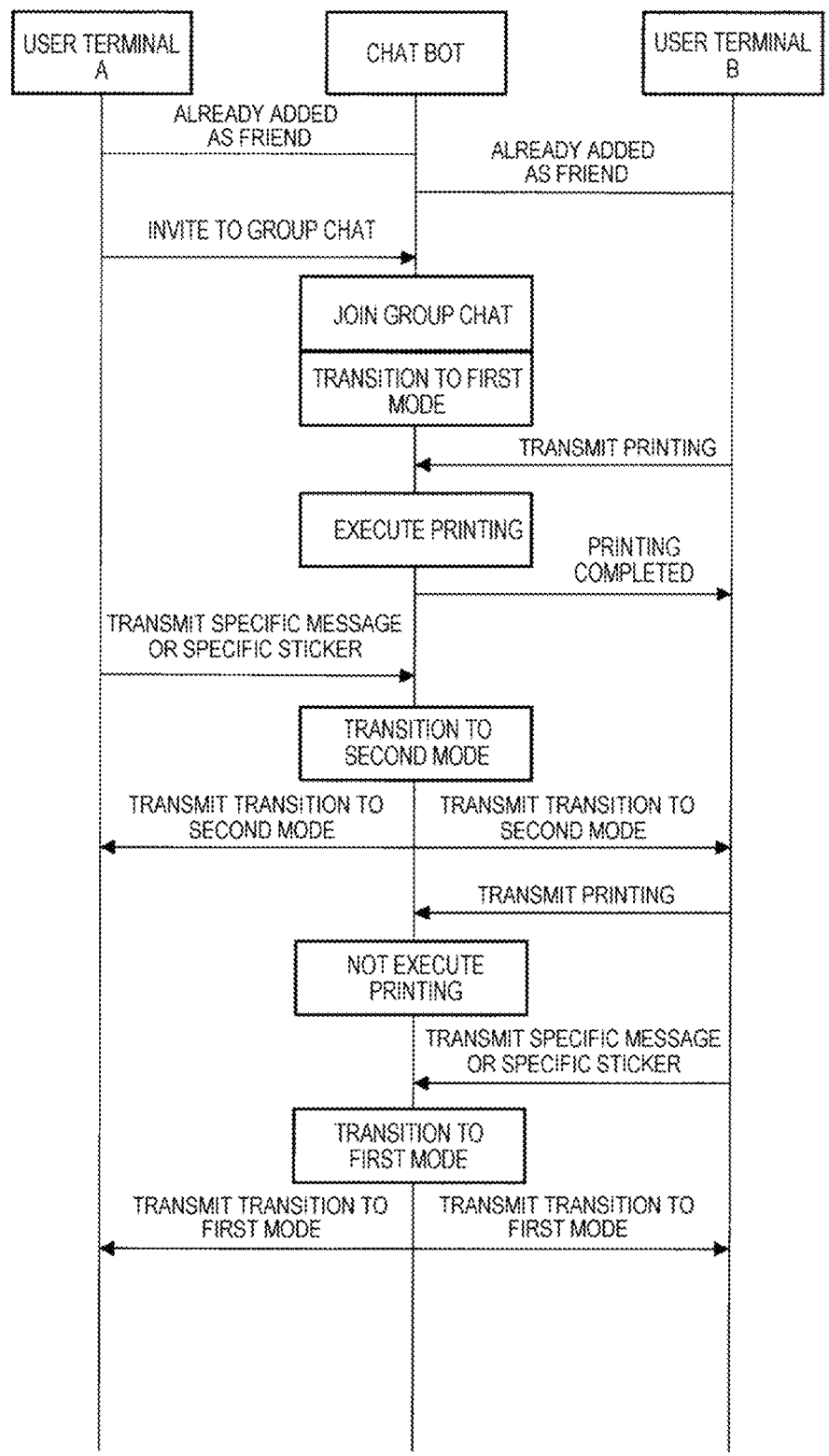
FIG. 12 is a sequence diagram according to the first exemplary embodiment.

FIG. 12 illustrates a sequence diagram of the present exemplary embodiment.

The user A operates the user terminal A to perform a specific operation (designate the account of the chatbot and operates the "add friend" button), to add the chatbot as a friend. The chatbot registers the user ID of the user A in the user information table. Similarly, the user B operates the user terminal B to add the chatbot as a friend. The chatbot registers the user ID of the user B in the user information table.

Subsequently, the user A invites the chatbot to the group chat formed by the user A and the user B.

In response to this invitation, the chatbot joins the group chat and also sets the operation mode of the chatbot to the first mode. The first mode may be set to the default mode of the chatbot. Also, the chatbot may transmit a message indicating that the chatbot has joined the group chat.

Subsequently, after confirming that the chatbot has joined the group chat, the user B transmits a message for instructing printing such as "Print."

The chatbot that receives this message executes the printing service in accordance with the printing instruction. When the printing service is completed, the chatbot transmits a message indicating that the printing has been completed, such as "Printing has been done."

Subsequently, when the user A determines that the chatbot responds unnecessarily, the user A transmits the first specific message such as "Be quiet" or the first specific sticker.

The chatbot that receives the first specific message or the first specific sticker transitions from the first mode to the second mode. Then, the chatbot transmits a message such as "Switch to quiet mode" to inform the user A and the user B of the transition to the second mode.

Subsequently, even when the user B transmits a message for instructing printing such as "Print," the printing service is not executed because the chatbot transitions to the second mode.

The user B then transmits the second specific message such as "Be active" or the second specific sticker.

The chatbot that receives the second specific message or the second specific sticker transitions from the second mode to the first mode. Then, the chatbot transmits a message such as "Switch to active mode" to inform the user A and the user B of the transition to the first mode.

While operating in the second mode, the chatbot receives messages and stickers from the users and sequentially stores the messages and the stickers in the message storage unit 167. The content analyzing unit 162 analyzes the contents of the messages and the stickers and outputs the analysis results to the operation controller 163. The operation controller 163 determines whether the current mode is the first mode or the second mode. When the current mode is the first mode, the operation controller 163 drives the printer A or the printer B in accordance with the analysis contents. When the current mode is the second mode, the analysis contents are ignored.

Second Exemplary Embodiment

The chatbot receives messages from the user and sequentially stores the messages in the message storage unit 167 while operating in the second mode. Thus, when the chatbot switches from the second mode to the first mode, the chatbot may trace the message received from the user while operating in the second mode and execute a service.

Figure 13:
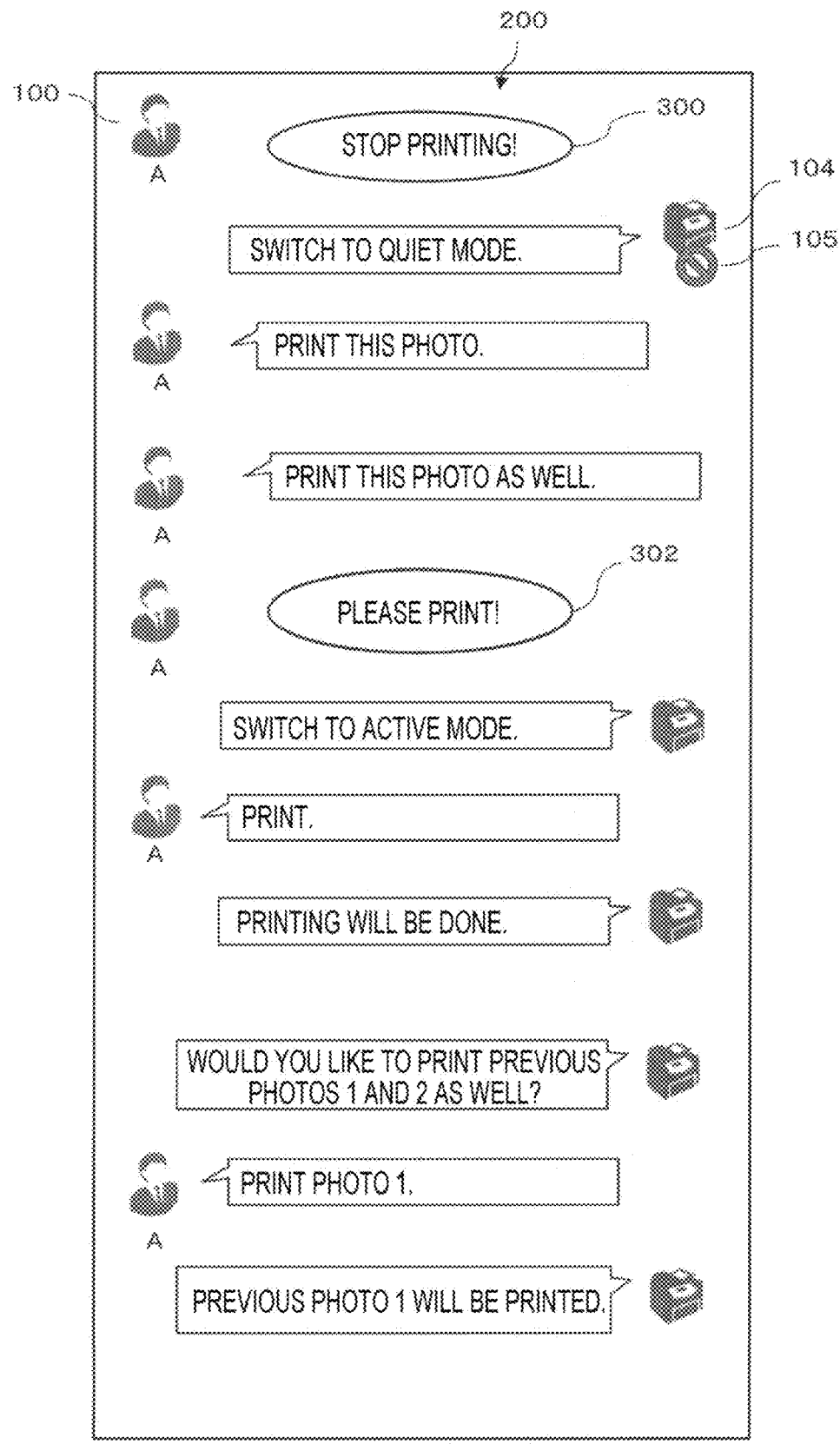
FIG. 13 is an explanatory diagram of a user terminal screen according to a second exemplary embodiment.

FIG. 13 illustrates an example of a screen displayed on the display unit of the user terminal A according to the present exemplary embodiment.

The user A transmits a specific sticker representing that "Stop printing!" at a desired timing.

The chatbot that receives this specific sticker switches from the first mode to the second mode, and creates and transmits a message that "Switch to quiet mode." The specific icon 105 is added to the icon 104, which indicates that the chatbot transitions to the second mode.

In this state, the user A sequentially transmits messages that "Print this photo" and "Print this photo as well." Photo 1 and photo 2 are respectively attached to the messages as image data.

The chatbot has switched from the first mode to the second mode. Thus, the chatbot does not execute the printing service in response to the messages for instructing printing, and sequentially stores the messages together with the image data in the message storage unit 167.

Subsequently, the user A transmits a specific sticker that "Please print!"

The chatbot that receives this specific sticker switches from the second mode to the first mode, and creates and transmits a message that "Switch to active mode." The specific icon 105 disappears from the icon 104, which indicates that the chatbot transitions to the first mode.

In this state, when the user A transmits a message such as "Print," since the chatbot has switched to the first mode, the chatbot creates a message that "Printing will be done" in response to the message, responds, and executes the printing service.

In addition, the chatbot refers to the messages which are received during the second mode before the chatbot switches to the current first mode and which are stored in the message storage unit 167 and determines whether there is a message for instructing printing and image data. When there is a message for instructing printing and image data that are received during the second mode, the chatbot extracts the message and the image data, creates a message that "Would you like to print previous photos 1 and 2 as well?" and responds.

When the user A who has viewed this message transmits a message such as "Print photo 1", the chatbot creates a message that "Previous photo 1 will be printed" in response to the message, responds, extracts photo 1 and executes the printing service. In the present exemplary embodiment, messages and image data received during the second mode are extracted. If only image data as print data is received, the image data may be extracted after transition to the first mode and then the printing service may be executed.

Third Exemplary Embodiment

In the first and second exemplary embodiments, when the chatbot switches from the first mode to the second mode, a message such as "Switch to quiet mode" is transmitted and the specific icon 105 is displayed to inform the user that the mode has been switched to the second mode. However, when this message is transmitted or the icon 105 is not displayed, or even when this message is transmitted and the icon 105 is displayed, the user may forget the message or the icon 105 thereafter. Thus, the chatbot may inform that the chatbot operates in the second mode at a proper timing.

Figure 14:
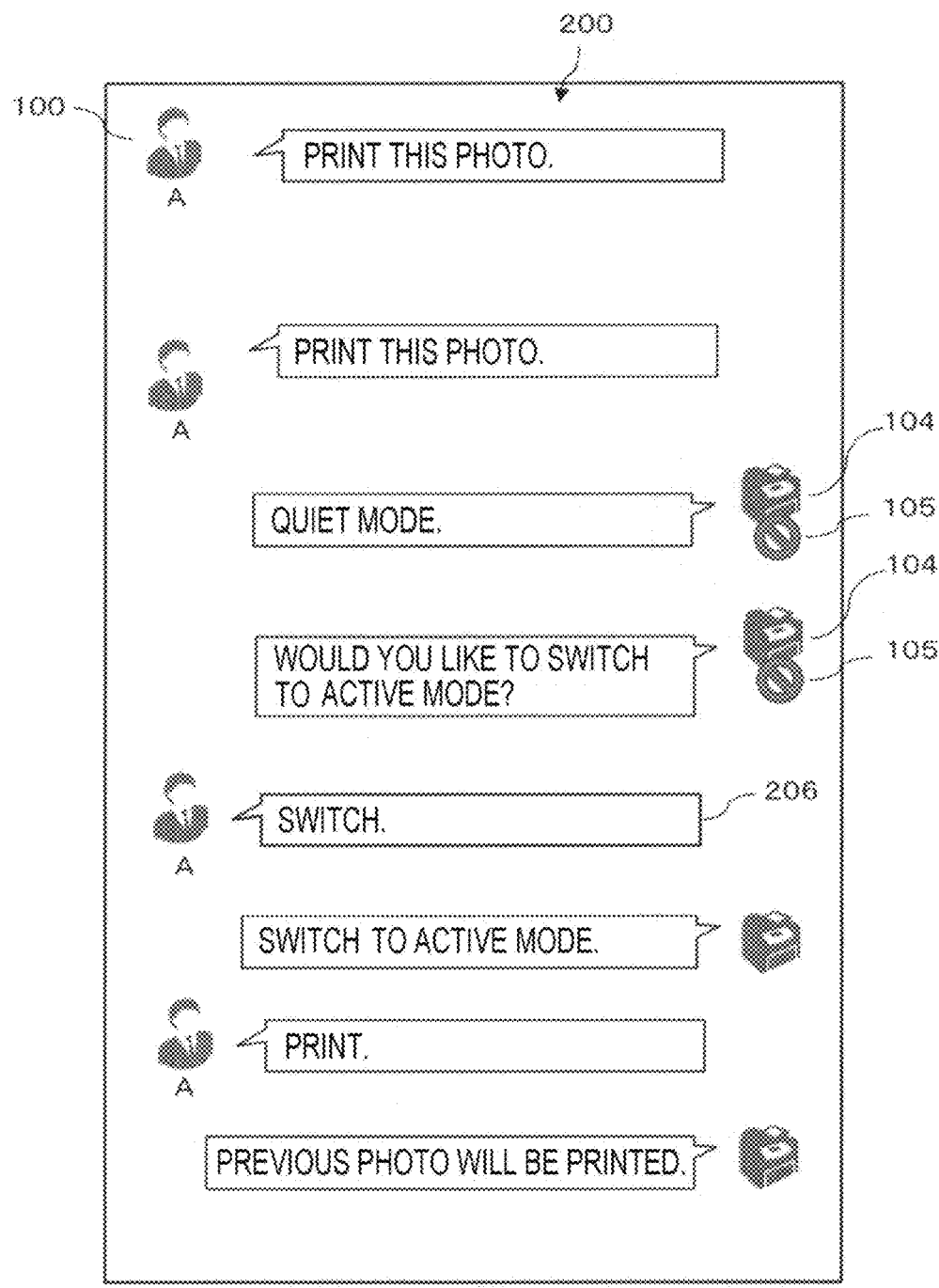
FIG. 14 is an explanatory diagram of a user terminal screen according to a third exemplary embodiment.

FIG. 14 illustrates an example of a screen displayed on the display unit of the user terminal A according to the present exemplary embodiment. It is assumed that the user A transmits a specific sticker representing that "Stop printing!" at a desired timing and that the chatbot that receives this specific sticker switches from the first mode to the second mode. In FIG. 14, the icon 105 indicating that the mode has been switched to the second mode is displayed. Alternatively, the icon 105 may not be displayed.

In this state, the user A transmits a message that "Print this photo." Since there is no response from the chatbot, and the user A transmits the message that "Print this photo" again.

The chatbot does not execute the printing service because switching to the second mode. However, when the number of times the chatbot receives the messages for instructing printing from the user while operating in the second mode reaches a predetermined number of times (for example, twice), the chatbot determines that the user does not recognize switching to the second mode, and creates a message that "Quiet mode" and responds. The chatbot further creates a message that "Are you sure you want to switch to active mode?" and responds.

The user A who has viewed this message transmits a message such as "Switch."

The chatbot that receives this message analyzes the contents of the message, determines that the message matches a specific message (second specific message), and switches from the second mode to the first mode. Then, the chatbot creates a message that "Switch to active mode" and responds.

Thereafter, the chatbot executes the printing service in accordance with a message for instructing printing from the user A. At this time, the chatbot may read from the message storage unit 167 the message and the image data which are received while the chatbot operates in the second mode, and execute a service. FIG. 14 illustrates that in order to execute the printing instruction that is issued while the chatbot operates in the second mode, the chatbot creates a message that "Previous photo will be printed" and executes the printing service of the image data in a retroactive manner.

In the present exemplary embodiment, two times are exemplified as the predetermined number of times. Alternatively, the predetermined number of times may be three or more, or may be once. In this case, a message indicating that the current mode is the quiet mode is transmitted every time a printing instruction from the user is received. In addition, when a predetermined period of time elapses after the chatbot switches to the second mode, the user may forget that the chatbot switches to the second mode. While the predetermined period of time does not elapse, the number of messages from the user exceeds a predetermined number after the chatbot switches to the second mode, and the message indicating that the chatbot switches to the second mode disappears from the messages displayed on the screen, and the user does not see the message unless scrolling the screen. Therefore, in this case, even when a message for instructing printing from the user is issued once, the chatbot may create a message that "Quiet mode" and make a response.

Fourth Exemplary Embodiment

In the first to third exemplary embodiments, the chatbot switches between the first mode in which the printing service is executed and the second mode in which the printing service is not executed. Instead of this, a first chatbot that executes the printing service and a second chatbot that does not execute the printing service may be provided as chatbots, and the first chatbot and the second chatbot may be switched in accordance with the specific message or the specific sticker from the user. The second chatbot that does not execute the printing service serves as a chatbot that receives messages from the user and sequentially stores the messages in the message storage unit 167 and that analyzes the contents of the messages. The second chatbot has a function of inviting the first chatbot to join a group chat as required. The first chatbot and the second chatbot are implemented by the bot server A. The first chatbot and the second chatbot are different program modules.

Figure 15:
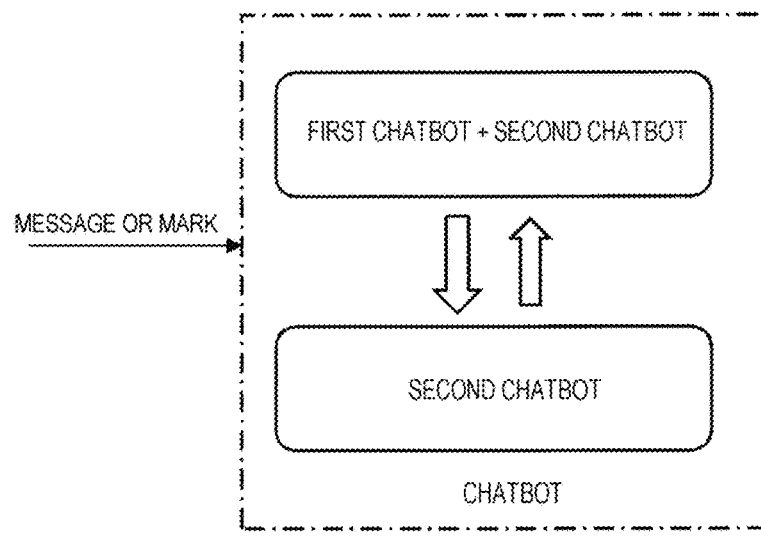
FIG. 15 is an explanatory diagram of mode switching according to a fourth exemplary embodiment.

FIG. 15 schematically illustrates an operation of a chatbot according to the present exemplary embodiment. The first chatbot and the second chatbot exist as the first mode illustrated in FIG. 8. The second chatbot exists as the second mode. When the first chatbot and the second chatbot exist, the second chatbot does not operate and only the first chatbot operates to receive messages from the user and to execute the printing service in accordance with the message for instructing printing. When only the second chatbot exists, the second chatbot receives messages from the user but does not execute the printing service, and invites the first chatbot to the group chat in accordance with the specific message or the specific sticker from the user. It may be said that in the first mode, the first chatbot operates and the second chatbot does not operate, and that in the second mode, the first chatbot does not operate and the second chatbot operates.

In the configuration in which only the first chatbot is caused to join or leave the group chat, when the first chatbot is once caused to leave a group chat and then caused to join the same group chat again, it is necessary to perform an operation to designate an account of the first chatbot and then invite the first chatbot to the group chat. By providing the second chatbot in addition to the first chatbot and configuring the second chatbot to automatically invite the first chatbot, the user's workload is reduced.

When the first chatbot and the second chatbot coexist, the printing service is executed. Therefore, switching from the first mode to the second mode is implemented by the first chatbot leaving the group chat. Also, switching from the second mode to the first mode is implemented by the first chatbot joining the group chat.

The second chatbot has a function of monitoring the messages from the user and inviting the first chatbot when the specific message or the specific sticker is transmitted. Therefore, the second chatbot may be referred to as a "monitoring chatbot."

Figure 16:
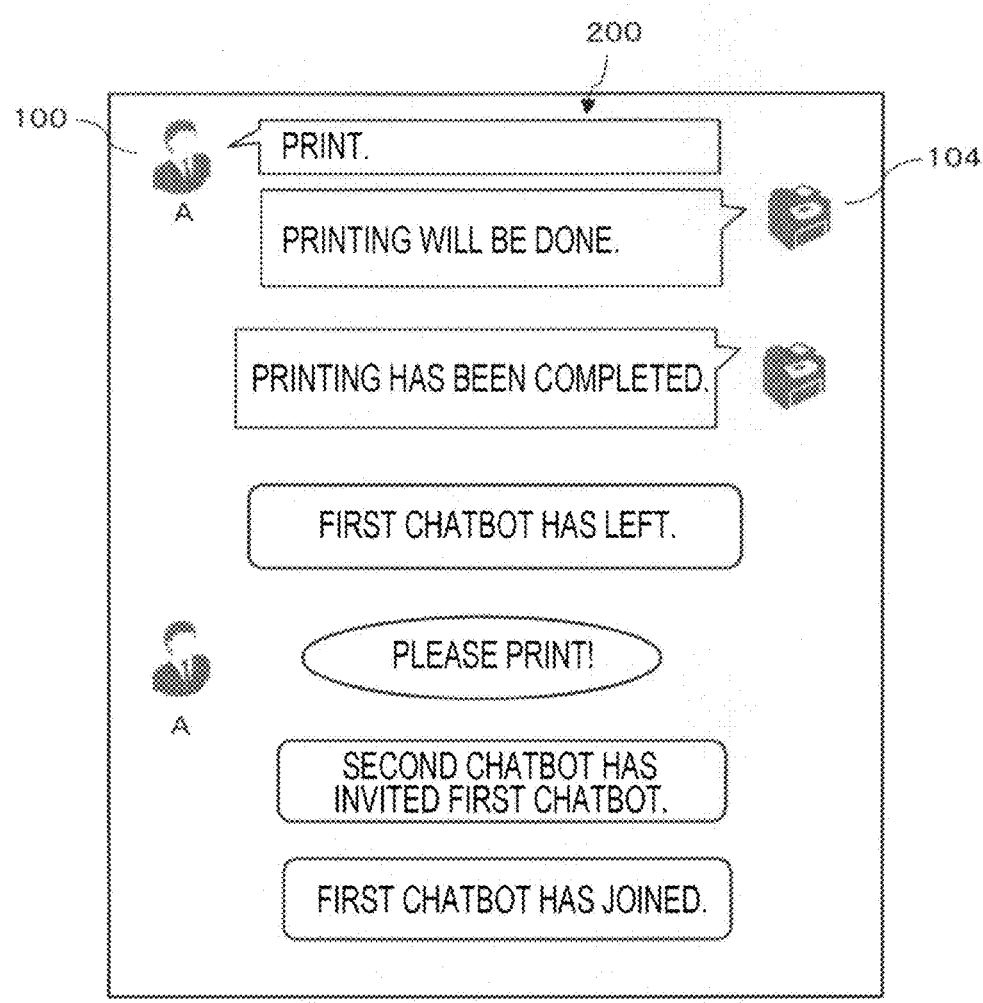
FIG. 16 is an explanatory diagram of a user terminal screen according to the fourth exemplary embodiment.

FIG. 16 illustrates an example of a screen displayed on the display unit of the user terminal A according to the present exemplary embodiment. It is assumed that in a default state, both the first chatbot and the second chatbot join the group chat. For example, it is assumed that when a user invites the first chatbot, the second chatbot is automatically invited together with the first chatbot.

The user A transmits a message that "Print."

The first chatbot that receives this message creates a message that "Printing will be done" in accordance with the message, responds, and executes the printing service. When the printing is completed, the first chatbot creates a message that "Printing has been completed" and responds. When executing the printing service, the first chatbot leaves the group chat, creates a message that "The first chatbot has left" and transmits the message. Instead of automatically leaving after executing the printing service, the first chatbot may leave in response to reception of the specific message or the specific sticker as in the first to third exemplary embodiments.

When the first chatbot leaves, only the second chatbot remains, and the mode is switched from the first mode to the second mode. The second chatbot does not execute the printing service. Therefore, the printing service is not executed even when a message or sticker for instructing printing from the user is received.

Subsequently, the user A transmits a sticker representing "Please print!" at a desired timing.

The second chatbot that receives this sticker analyzes the contents of the sticker, determines that the sticker matches a specific sticker, and automatically invites the first chatbot to the group chat without an invitation message from the user. The second chatbot stores information required to invite the first chatbot (the account of the first chatbot). When the first chatbot joins the group chat, a message that "The first chatbot has joined" is transmitted to inform the user that the mode has been switched from the second mode to the first mode.

Figure 17:
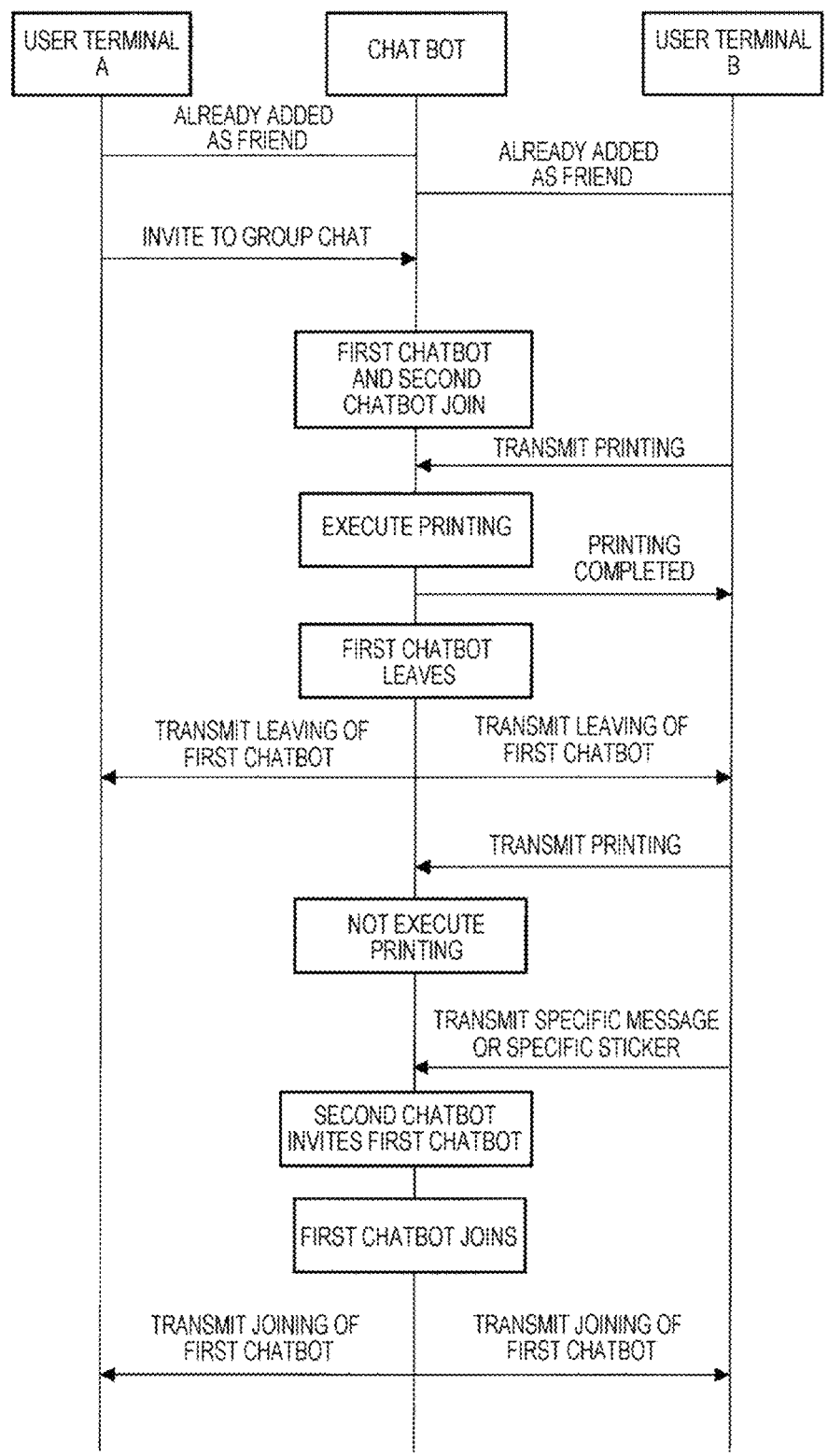
FIG. 17 is a sequence diagram according to the fourth exemplary embodiment.

FIG. 17 is a sequence diagram of the present exemplary embodiment.

Each of the user A and the user B adds a chatbot as a friend. It should be noted that when the first chatbot is added as a friend, the second chatbot is automatically added as a friend accordingly.

Subsequently, the user A invites the first chatbot to the group chat. In response to this invitation, the second chatbot joins the group chat as well as the first chatbot. At this time, a response may be made by creating a message that "The first chatbot and the second chatbot have joined." Alternatively, a response may be made by simply creating a message that "The first chatbot has joined." This is because the second chatbot may be regarded as a software robot program that operates in the background of the first chatbot and the users do not need to recognize the existence of the second chatbot.

When the user B transmits a printing instruction in the first mode in which the first chatbot and the second chatbot join, the first chatbot executes the printing service accordingly. When the printing is completed, a message to that effect is transmitted. When the printing service is executed, the first chatbot leaves the group chat automatically or in response to the reception of the specific message or the specific sticker from the user, and a message indicating that the first chatbot has left is transmitted to the user A and the user B.

In the second mode in which the first chatbot has left and only the second chatbot has joined, the second chatbot does not execute the printing service even when the user B transmits a printing instruction.

In this state, when the user B transmits the specific message or the specific sticker, the second chatbot invites the first chatbot in accordance with the specific message or the specific sticker so that the first chatbot joins the group chat again. Thereafter, a message indicating that the first chatbot has joined is transmitted to the user A and the user B.

In the present exemplary embodiment, when the first chatbot joins the group chat, the second chatbot automatically joins the group chat. Therefore, the screen may be configured for the users to be able to recognize the existence of the second chatbot.

Figure 18:
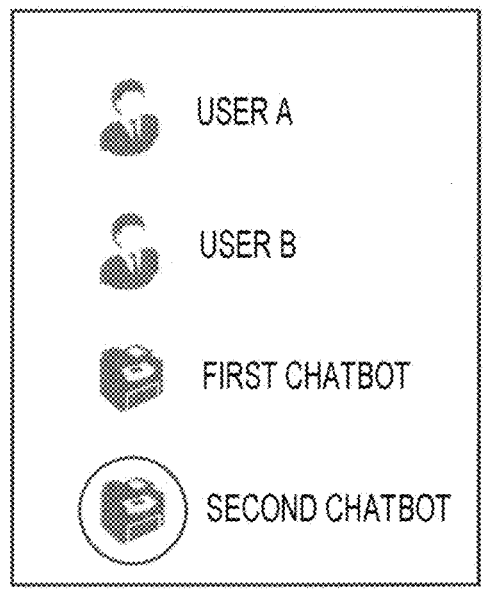
FIG. 18 is an explanatory diagram of a user terminal screen according to the fourth exemplary embodiment.

FIG. 18 is an example of a screen, of a list of users (members) who join the group chat, displayed on the display unit of the user terminal A. In addition to the user A, the user B, and the first chatbot, the second chatbot is also displayed as a participating member. This allows the users to easily recognize the existence of the second chatbot. The second chatbot serves as a background of the first chatbot. Therefore, the second chatbot may be displayed as an icon which is different from the first chatbot (but has a commonality that may be found to have a certain relevance).

Fifth Exemplary Embodiment

In the fourth exemplary embodiment, when the first chatbot joins the group chat, the second chatbot automatically joins the group chat. Alternatively, even when the first chatbot joins the group chat, the second chatbot may not automatically join the group chat, and the user may manually causes the second chatbot to join the group chat.

Figures 19A, 19B:
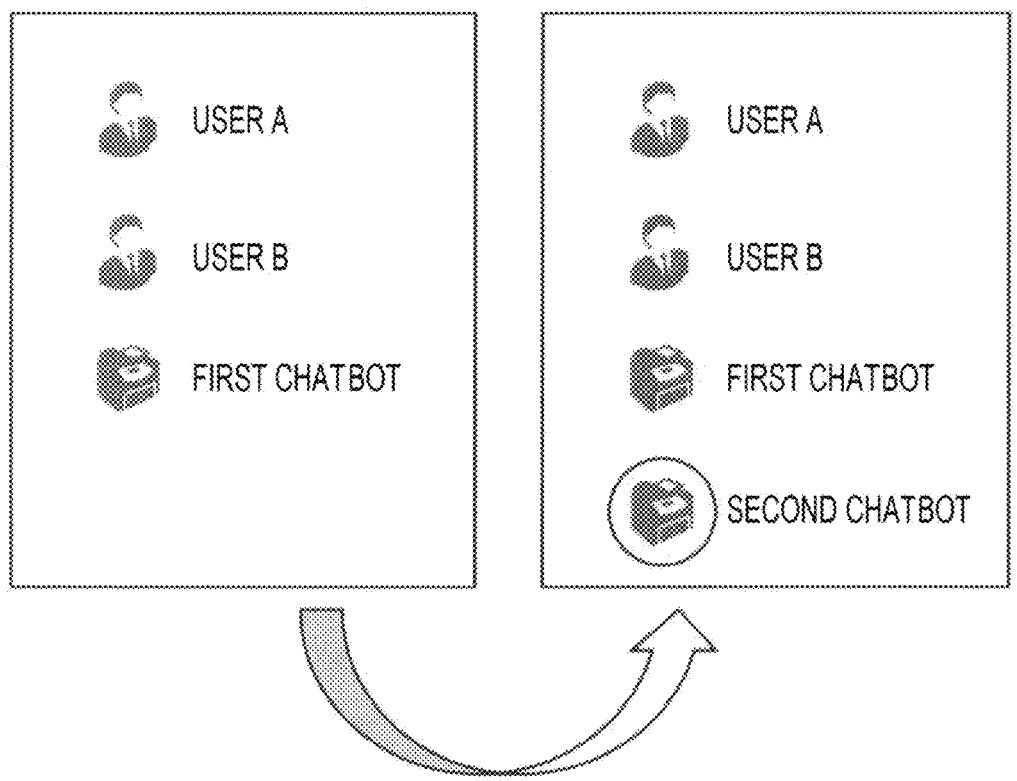
FIGS. 19A and 19B are each explanatory diagram of a user terminal screen according to a fifth exemplary embodiment.

FIGS. 19A and 19B illustrates an example of a screen displayed on the display unit of the user terminal A in this case. FIG. 19A illustrates a state in which the first chatbot joins the group chat. The user A, the user B, and the first chatbot are displayed as participating members. Thereafter, the user A designates the account of the second chatbot and invites the second chatbot. When the second chatbot joins, the second chatbot is displayed as a new participating member as illustrated in FIG. 19B.

When the first chatbot joins, the first chatbot may display the account of the second chatbot and then transmit a message that prompts the users to invite the second chatbot.

Sixth Exemplary Embodiment

Descriptions will be made on an example in which a chatbot that provides a printing service as a specific process in accordance with a message from a user.

In a sixth exemplary embodiment, when an operation instruction is included in the message from the user, the bot server A (16A) and the bot server B (16B) execute specific service contents as a specific process in accordance with the operation instruction.

In addition, the operation controller 163 outputs a printing command to the printers A and B in response to the message from the user. In addition, the operation controller 163 controls the operation mode of a chatbot. Specifically, in the default state, the chatbot is set to be in an operation mode in which the chatbot executes the printing service. After executing the printing service, the chatbot transitions to an operation mode in which the chatbot does not execute the printing service.

When the user A and the user B form the same group and is performing a group chat, the user A may cause a chatbot, which the user A has added as a friend, to enter (join) the group chat. The user A and the user B may appropriately issue a printing instruction to the chatbot to execute the printing service while enjoying a chat. However, if the chatbot still joins the group chat even after the execution of the printing service, the chatbot may automatically respond to the chat between the user A and the user B, and execute the printing service without complying with the intention of the user A or the user B.

Therefore, in the present exemplary embodiment, after the printing service is executed in a state in which the chatbot joins the group chat, the chatbot automatically leaves the group chat, so that unnecessary execution of the printing service which does not follow the intention of user A or user B is prevented. When the chatbot has left, the message receiving unit 161 does not receive a message from the user, and therefore, does not analyze the contents thereof to provide the printing service. In addition, the received message is not stored in the message storage unit 167.

Figure 21:
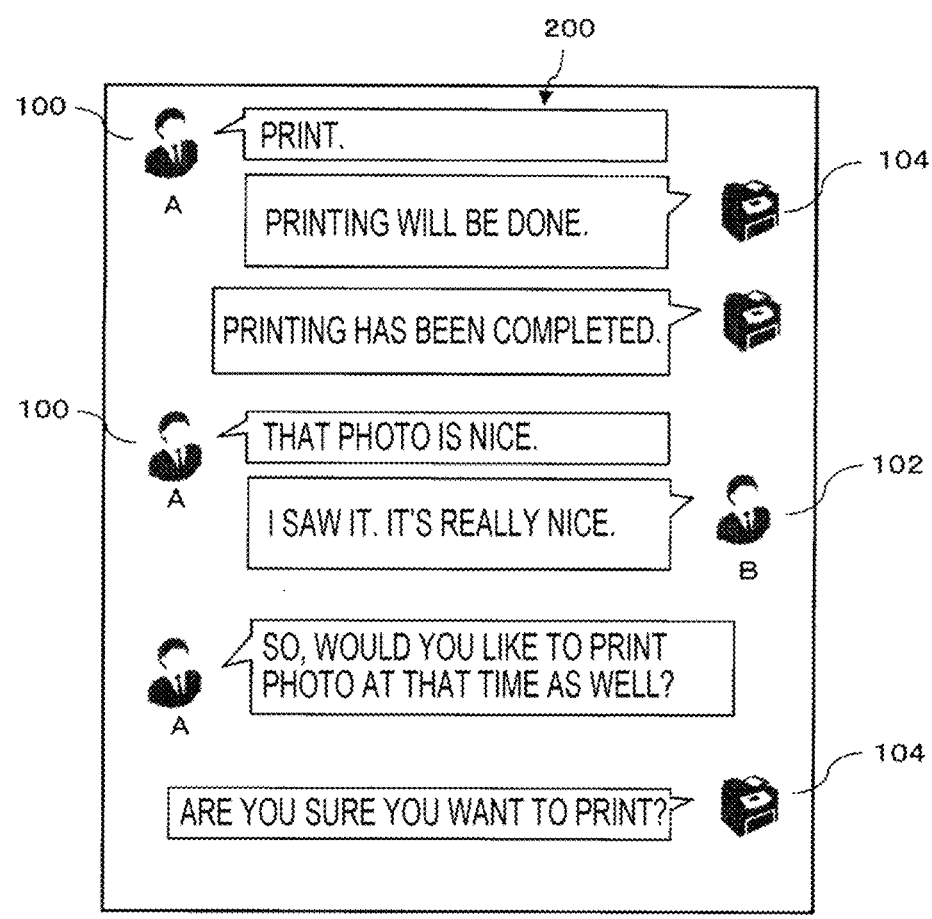
FIG. 21 is an explanatory diagram of a user terminal screen according to a sixth exemplary embodiment.

FIG. 21 illustrates an example of a screen displayed on the display unit of the user terminal A when only the user A exchanges messages with the chatbot. The chat service server 14 displays, on the screen of the user terminal A, a visual representation figure (icon) 100 representing the user A and an icon 104 representing the chatbot. Further, messages 200 of the user A and the chatbot are displayed in time-series from top to bottom.

The user A operates the user terminal A to transmit a message "Print" to the chatbot. The user A also attaches image data to be printed along with the message. The user A may only transmit the image data instead of the message.

The chatbot that receives the message analyzes the contents of the message and interprets the contents of the message as a printing instruction, creates a message that "Printing will be done." to make an automatic response, and drives the printer A or the printer B in accordance with the setting information of the user A to execute the printing service. When the printing is completed, the chat bot creates a message that "Printing has been completed." to make an automatic response.

It is assumed that even after executing the printing service, the chatbot still joins the group chat.

Thereafter, the user A operates the user terminal A to transmit a message "That photo is nice." The message is transmitted to all users who join the group chat (including the chatbot). Then, the user B who has viewed the message operates the user terminal B to transmit a message that "I saw it. It's really nice." This message is also transmitted to all users who join the group chat (including the chatbot). Then, the user A who has viewed this message transmits a message that "So, would you like to print photo at that time as well?" Since this message is also transmitted to all users who join the group chat (including the chatbot), the chatbot may extract a keyword "print" included in this message, create a message that "Are you sure you want to print?" and make an automatic response. The user A intends that the message is a message for the user B, and it is not desirable that the chatbot attempts to automatically respond to this message and execute the printing service even though he/she does not intend to print.

Therefore, in the present exemplary embodiment, when the printing service is executed, the chatbot automatically leaves, so that the chatbot is prevented from unnecessarily responding to a message from the user.

Figure 22:
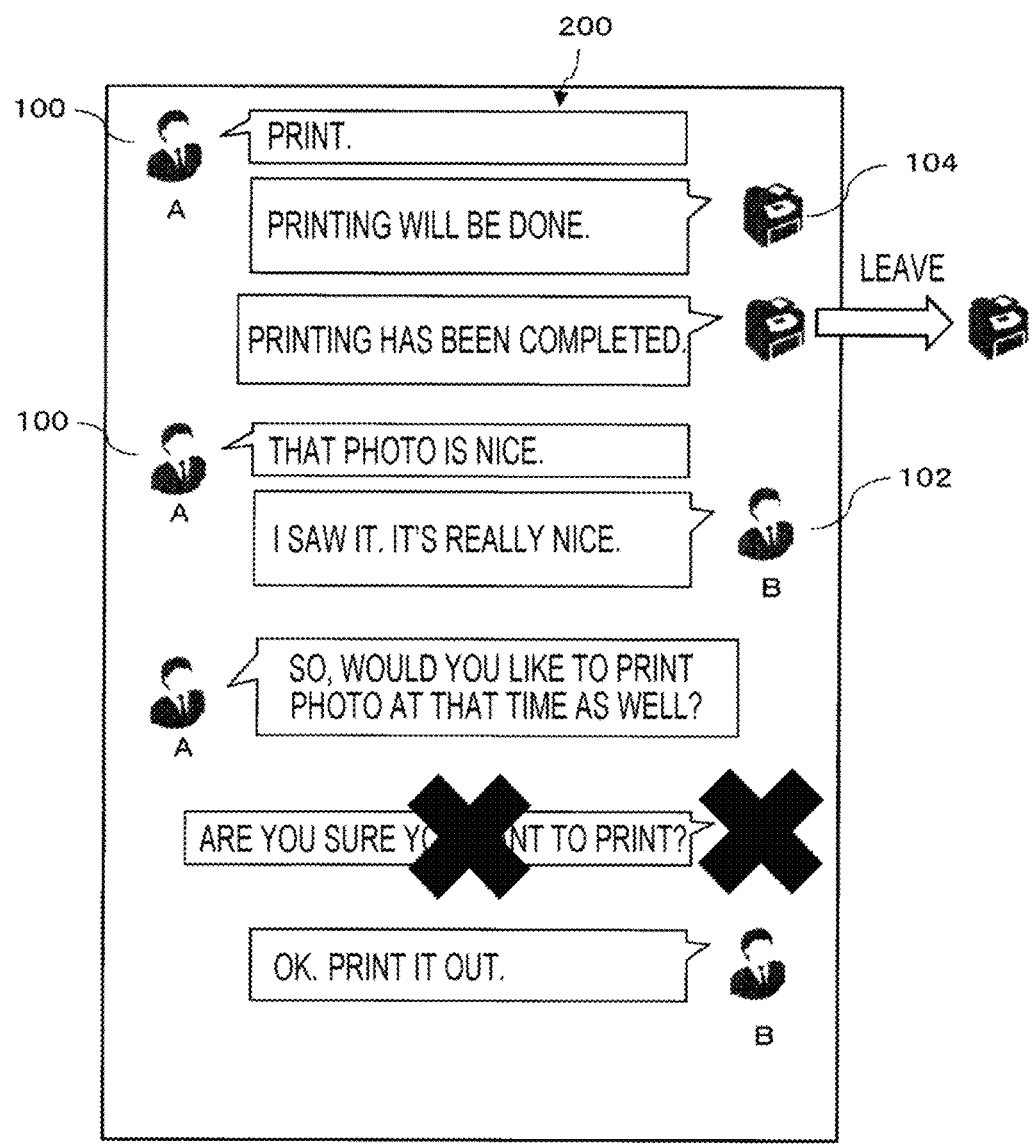
FIG. 22 is an explanatory diagram of a user terminal screen according to the sixth exemplary embodiment.

FIG. 22 illustrates an example of a screen displayed on the display unit of user terminal A according to the present exemplary embodiment.

The user A operates the user terminal A to transmit a message "Print" to the chatbot. The user A also attaches image data to be printed along with the message. The user A may only transmit the image data instead of the message.

The chatbot that receives the message analyzes the contents of the message and interprets the contents of the message as a printing instruction, creates a message that "Printing will be done." to make an automatic response, and drives the printer A or the printer B in accordance with the setting information of the user A to execute the printing service. When the printing is completed, the chatbot confirms the completion notification from the printer A or the printer B, and then, creates a message that "Printing has been completed." to make an automatic response.

Then, the chatbot leaves the group chat immediately after executing the printing service. In a state where the chatbot has left, the message receiving unit 161, the content analyzing unit 162, the operation controller 163, and the response message creating unit 164 stop operating. Further, in the leaving state, the message receiving unit 161, the content analyzing unit 162, and the operation controller 163 may maintain the operating state, and the operation controller 163 may stop driving of the printers A and B, while controlling the response message creating unit 164 to be in a non-operating state. Accordingly, an "entry" state of the chatbot according to the present exemplary embodiment indicates a state in which a message from the user may be responded to, more specifically, a state in which the message receiving unit 161, the content analyzing unit 162, the operation controller 163, and the response message creating unit 164 are in the operating state. A "leaving" state indicates a state in which a message from the user is not responded to, more specifically, a state in which at least the operation controller 163 and the response message creating unit 164 are not in the operating state.

Thereafter, the user A operates the user terminal A to transmit a message "That photo is nice." The message is transmitted to all users who join the group chat. Then, the user B who has viewed the message operates the user terminal B to transmit a message that "I saw it. It's really nice." This message is also transmitted to all users who join the group chat. Then, the user A who has viewed this message transmits a message that "So, would you like to print photo at that time as well?" This message is also transmitted to all users who join the group chat. However, the chatbot has already left and is in the non-operating state. Therefore, the chatbot does not extract the keyword "print" and create a message that "Are you sure you want to print?" to make an automatic response. In FIG. 22, the mark X indicates that such an automatic response message is not transmitted.

The user B who has viewed the message from the user A transmits a message such as "OK. Print it out," so that a smooth chat between the user A and the user B may be maintained.

In FIG. 22, the chatbot leaves immediately after executing the printing service. Alternatively, the chatbot may transmit a message indicating that the chatbot has left when leaving the group chat.

Figure 23:
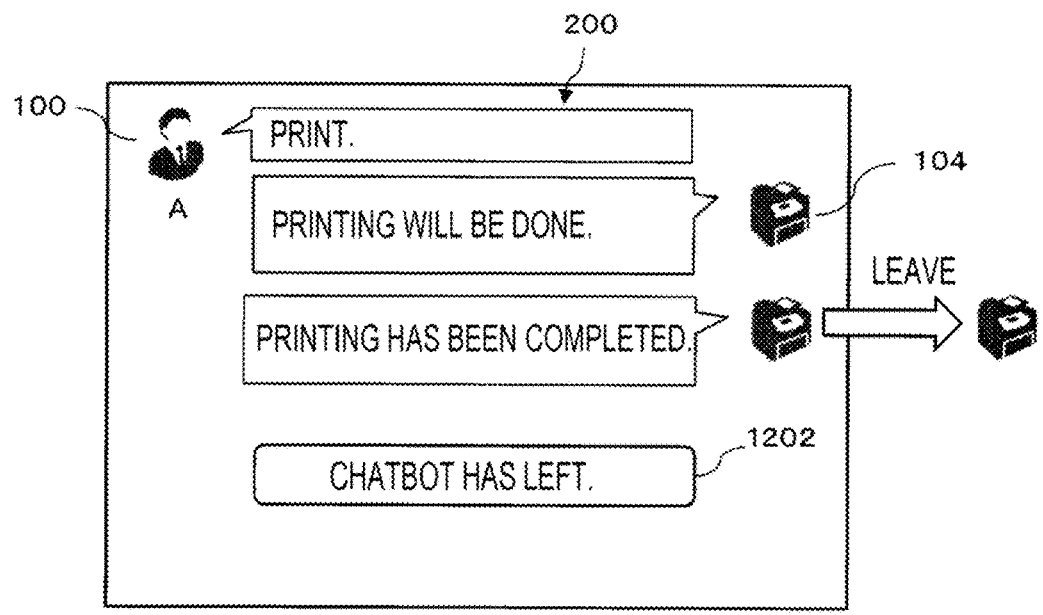
FIG. 23 is an explanatory diagram of a user terminal screen according to the sixth exemplary embodiment.

FIG. 23 illustrates an example of a screen in such a case.

The user A operates the user terminal A to transmit a message "Print" to the chatbot. The user A also attaches image data to be printed along with the message. The user A may only transmit the image data instead of the message.

The chatbot that receives the message analyzes the contents of the message and interprets the contents of the message as a printing instruction, creates a message that "Printing will be done." to make an automatic response, and drives the printer A or the printer B in accordance with the setting information of the user A to execute the printing service. When the printing is completed, the chatbot confirms a completion notification from the printer A or the printer B and then creates a message that "Printing has been completed" to make an automatic response.

Then, the chatbot leaves the group chat immediately after executing the printing service and transitions from the first operation mode to the second operation mode. At this time, the chatbot creates and transmits a message 1202 that "The chatbot has left."

The user A and the user B who have viewed this message may recognize that the chatbot has left.

Seventh Exemplary Embodiment

In FIGS. 22 and 23, the chatbot leaves immediately after executing the printing service. Alternatively, a predetermined period of time after the printing service is executed may be defined as a leaving waiting period, and the chatbot may leave if there is no specific message from the user within this predetermined period of time.

Figure 24:
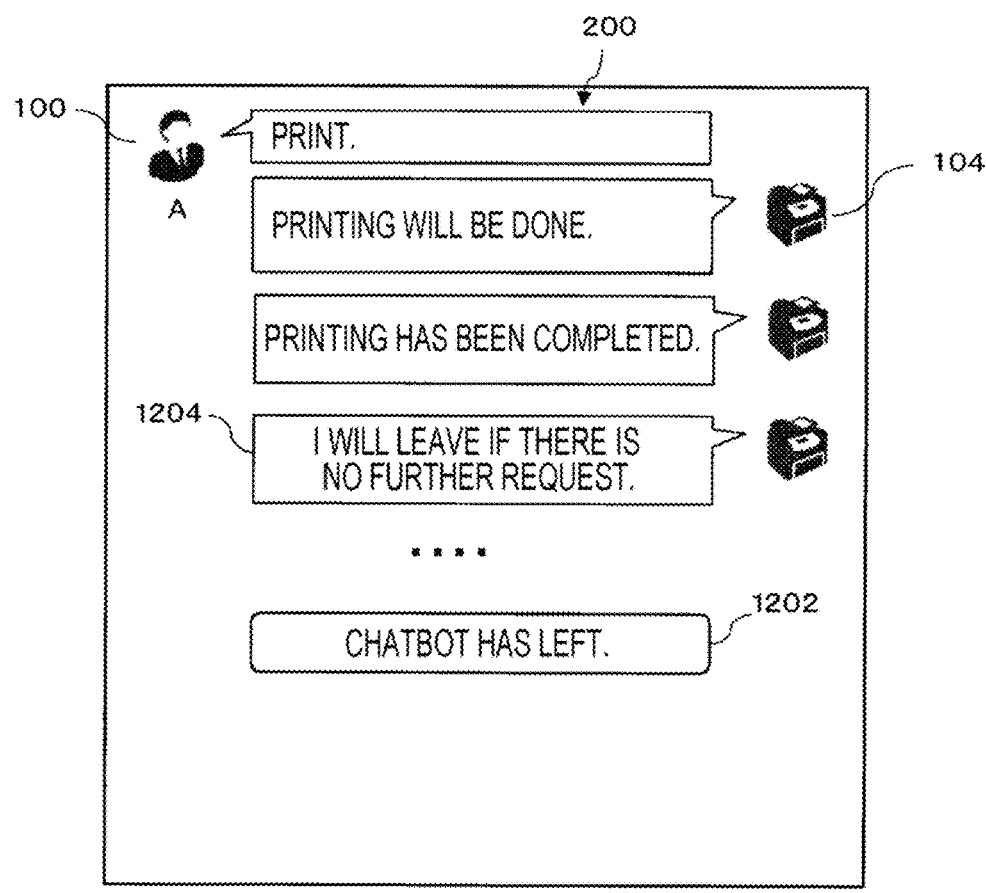
FIG. 24 is an explanatory diagram of a user terminal screen according to a seventh exemplary embodiment.

FIG. 24 illustrates an example of a screen in such a case.

The user A operates the user terminal A to transmit a message "Print" to the chatbot. The user A also attaches image data to be printed along with the message. The user A may only transmit the image data instead of the message.

The chatbot that receives the message analyzes the contents of the message and interprets the contents of the message as a printing instruction, creates a message that "Printing will be done." to make an automatic response, and drives the printer A or the printer B in accordance with the setting information of the user A to execute the printing service. When the printing is completed, the chatbot confirms a completion notification from the printer A or the printer B and then creates a message that "Printing has been completed" to make an automatic response.

Then, after executing the printing service, the chatbot notify a leaving schedule by creating a message 1204 that "I will leave if there is no further request" and responding, and transitions to a standby state for the predetermined period of time. The predetermined period of time may be set to, for example, 3 minutes. It should be noted that the predetermined period of time is not limited to 3 minutes.

When there is no specific message from the user within the predetermined period of time, the chatbot leaves and transmits a message 1202 that "The chatbot has left" after the elapse of the predetermined period of time.

Figure 25:
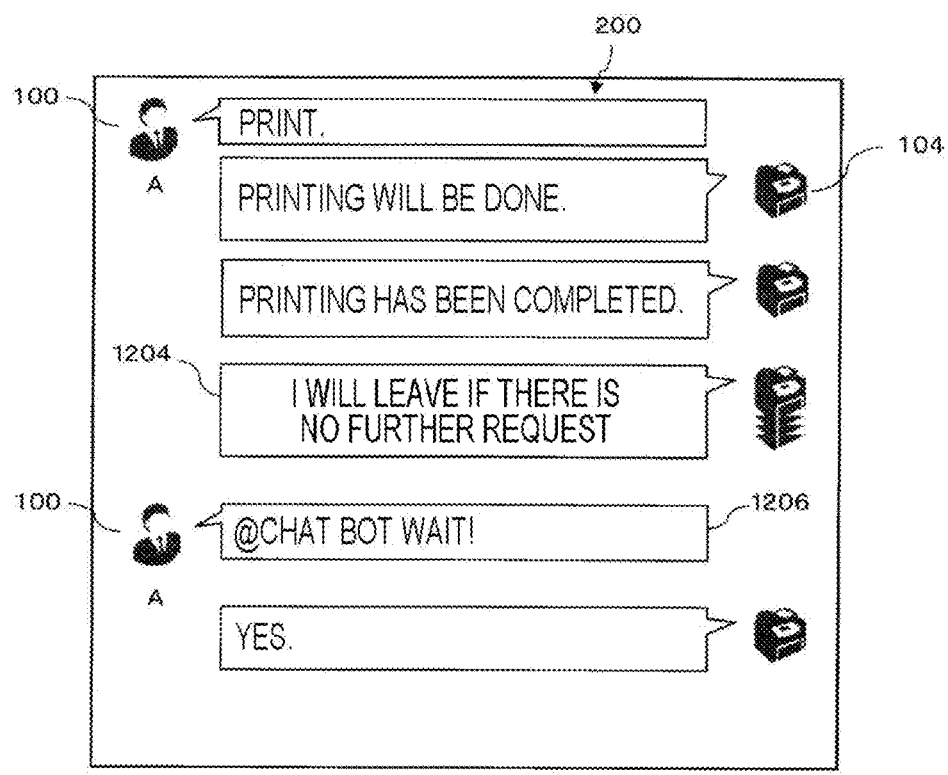
FIG. 25 is an explanatory diagram of a user terminal screen according to the seventh exemplary embodiment.

In the meantime, FIG. 25 illustrates an example of a screen in which a specific message is transmitted from the user within the predetermined period of time.

The user A operates the user terminal A to transmit a message "Print" to the chatbot. The user A also attaches image data to be printed along with the message. The user A may only transmit the image data instead of the message.

The chatbot that receives the message analyzes the contents of the message and interprets the contents of the message as a printing instruction, creates a message that "Printing will be done." to make an automatic response, and drives the printer A or the printer B in accordance with the setting information of the user A to execute the printing service. When the printing is completed and the chatbot confirms the completion notification from the printer A or the printer B, the chatbot creates a message that "Printing has been completed" to make an automatic response.

Then, after executing the printing service, the chatbot notify a leaving schedule by creating a message 1204 that "I will leave if there is no further request" and responding, and transitions to a standby state for the predetermined period of time.

The user A who has viewed this message transmits a message 1206 that "@chatbot wait!" within the predetermined period of time. Here, "@chatbot" indicates that the message is directed to a specific member (here, the chatbot) in the group chat.

When receiving this message 1206, the chatbot analyzes the contents of the message 1206, determines that the message 1206 matches a specific message, releases the leaving standby state, creates a message that "Yes," and responds.

When a specific sticker instead of the specific message is transmitted from the user within the predetermined period of time, the chatbot may release the leaving standby state and maintain the entry state.

Figure 26:
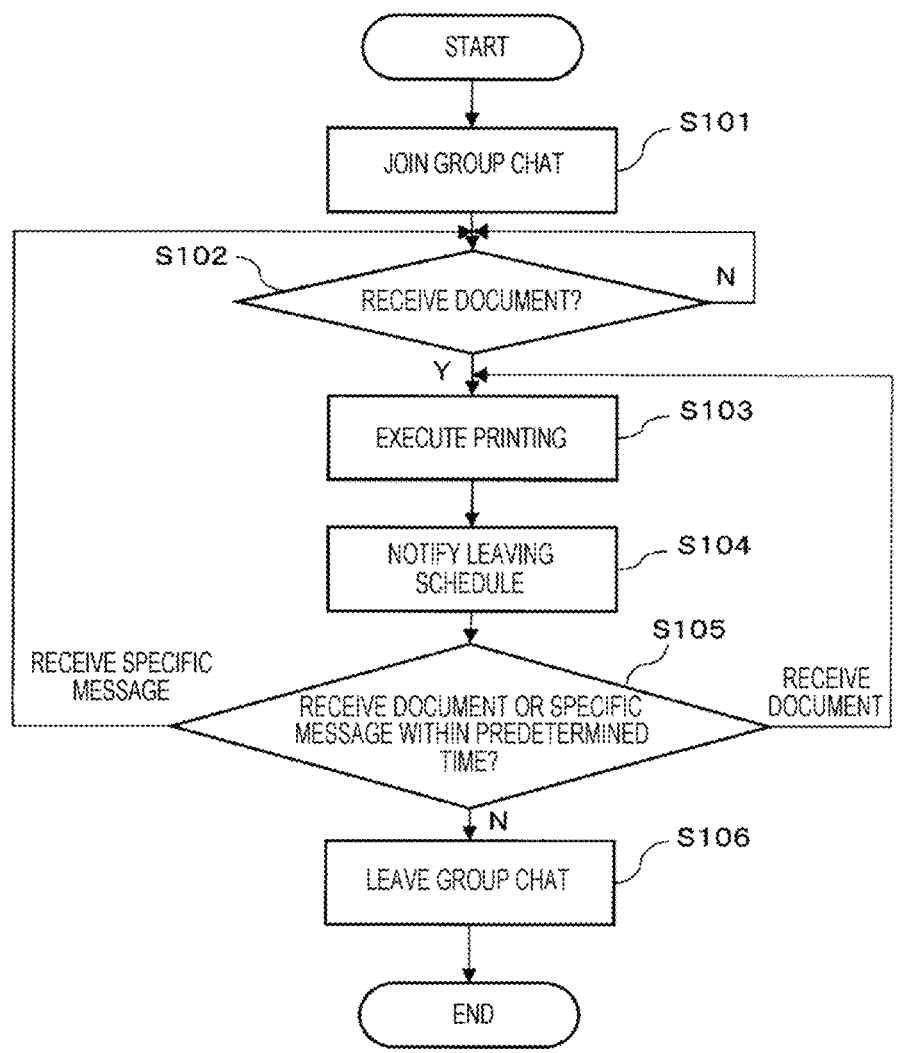
FIG. 26 is a process flowchart according to the seventh exemplary embodiment.

FIG. 26 illustrates a process flowchart of the chatbot.

The chatbot enters (joins) a group chat room in response to an invitation operation performed by a participating member of the group chat, for example, the user A (S101). In the entry state, the message receiving unit 161 receives messages and sequentially stores the messages in the message storage unit 167, and the content analyzing unit 162 analyzes the contents of the messages and outputs analysis results to the operation controller 163. When the contents of the message is the printing instruction, the operation controller 163 executes the printing service by driving the printers A and B. In addition, the response message creating unit 164 creates a message in accordance with the message from the user and transmits the created message. It is assumed that before entering (joining) the group chat, the user A and the user B have added the chatbot as a friend and obtained the chatbot use authority.

When the chatbot joins the group chat, the chatbot receives a message from the user, and determines whether the message is the printing instruction, that is, whether a document that is image data to be printed is included therein (S102).

When receiving the document ("YES" in S102), the chatbot executes the printing service in response to the printing instruction (S103). Then, the chatbot informs the leaving schedule by transmitting a message that "I will leave if there is no further request" (S104) and transitions to the standby state for the predetermined period of time. The predetermined period of time is, for example, 3 minutes.

Then, it is determined whether the document or the specific message is received within the predetermined period of time (S105). When the predetermined period of time has elapsed without receiving the document or the specific message ("NO" in S105), the chatbot automatically leaves the group chat.

On the other hand, when the document is received within the predetermined period of time, the standby state is released and the entry state is maintained as it is. Then, the process proceeds to S103 to execute the printing service of the document. In addition, even when a specific message such as "@chatbot wait!" is received within the predetermined period of time, the standby state is released, the entry state is maintained as it is, and the process proceeds to S102 to determine whether the document is received.

Eighth Exemplary Embodiment

In the sixth or seventh exemplary embodiment, when leaving the group chat, the chatbot may not only transmit a message indicating that the chatbot has left, but also may notify the user of information for causing the chatbot to enter (join) the group chat again after leaving.

Figure 27:
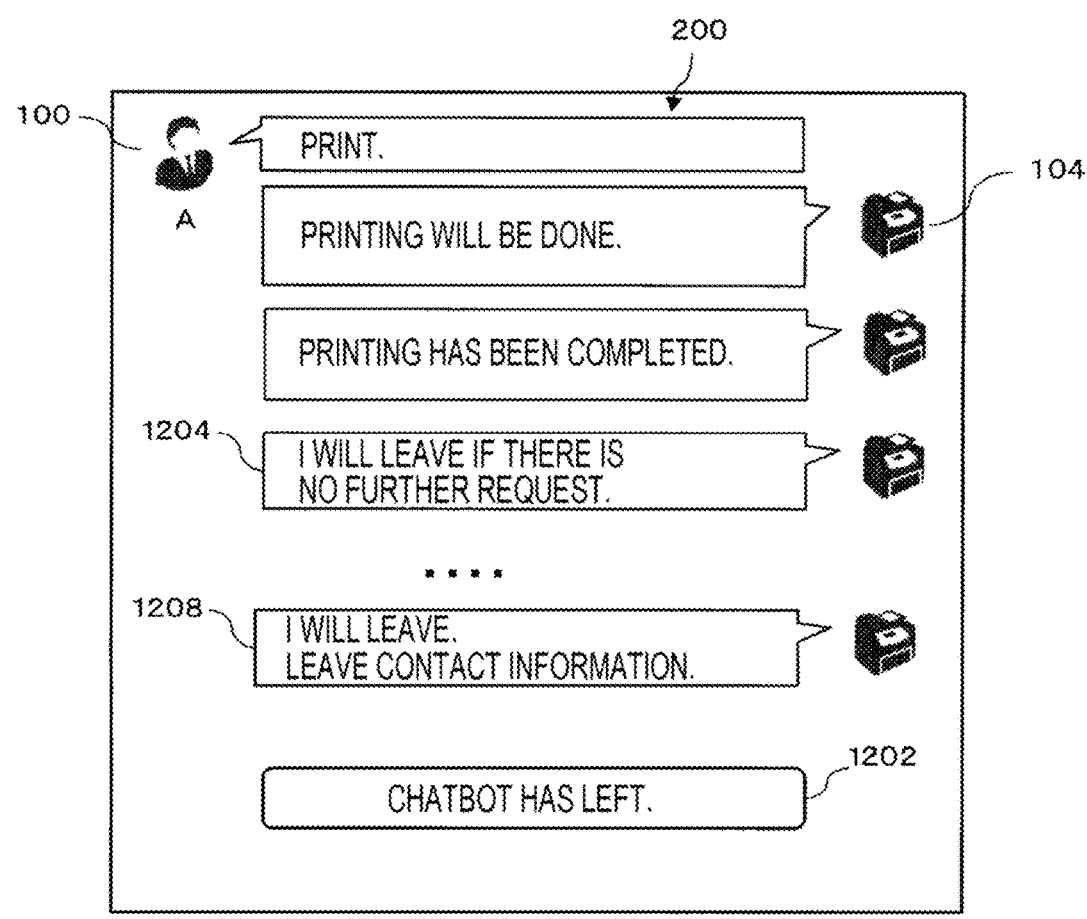
FIG. 27 is an explanatory diagram of a user terminal screen according to an eighth exemplary embodiment.

FIG. 27 illustrates an example of a screen in such a case.

The user A operates the user terminal A to transmit a message "Print" to the chatbot. The user A also attaches image data to be printed along with the message. The user A may only transmit the image data instead of the message.

The chatbot that receives the message analyzes the contents of the message and interprets the contents of the message as a printing instruction, creates a message that "Printing will be done." to make an automatic response, and drives the printer A or the printer B in accordance with the setting information of the user A to execute the printing service. When the printing is completed, the chat bot creates a message that "Printing has been completed." to make an automatic response.

Then, after executing the printing service, the chatbot creates a message 1204 that "I will leave if there is no further request," responds, and transitions to the standby state for the predetermined period of time. The predetermined period of time may be set to, for example, 3 minutes. It should be noted that the predetermined period of time is not limited to 3 minutes.

When there is no specific message from the user within the predetermined period of time, the chatbot leaves and transmits a message 1208 that "I will leave" and "I leave contact information" after the predetermined period of time. The contact information may be a URL or data collectively indicating the account name and contact information of the chatbot. A tool (or a notebook) for sharing documents, photos, or the like among participating members may be used. For example, the chatbot may leave its own account name and contact information in the sharing tool.

After notifying the contact information, the chatbot transmits the message 1202 that "The chatbot has left."

Ninth Exemplary Embodiment

In the sixth to eighth exemplary embodiments, the chatbot leaves the group chat immediately after executing the printing service or after the elapse of the predetermined period of time. Alternatively, when the user wants to use the chatbot again, it is necessary for the user to invite the chatbot to join the group chat again, which is burdensome.

Then, in the present exemplary embodiment, a first chatbot that executes the printing service and a second chatbot that does not execute the printing service are provided as chatbots. The second chatbot continues to join the group chat even immediately after the printing service is executed or even after the first chatbot automatically leaves after the elapse of the predetermined period of time. The second chatbot that does not execute the printing service serves as a chatbot that receives messages from the user and sequentially stores the messages in the message storage unit 167 and that analyzes the contents of the messages. The second chatbot has a function of inviting the first chatbot to join a group chat as required. The first chatbot and the second chatbot are implemented by the bot server A. The first chatbot and the second chatbot are different program modules. When the first chatbot enters (joins) a group chat in response to an invitation operation performed by a participating member of the group chat, for example, the user A, the second chatbot joins the group chat together with the first chatbot. It should be noted that when the first chatbot joins the group chat and is in the operating state, the second chatbot does not receive messages, analyze messages, drive the printers A and B, and create and transmit a response message.

Figure 28:
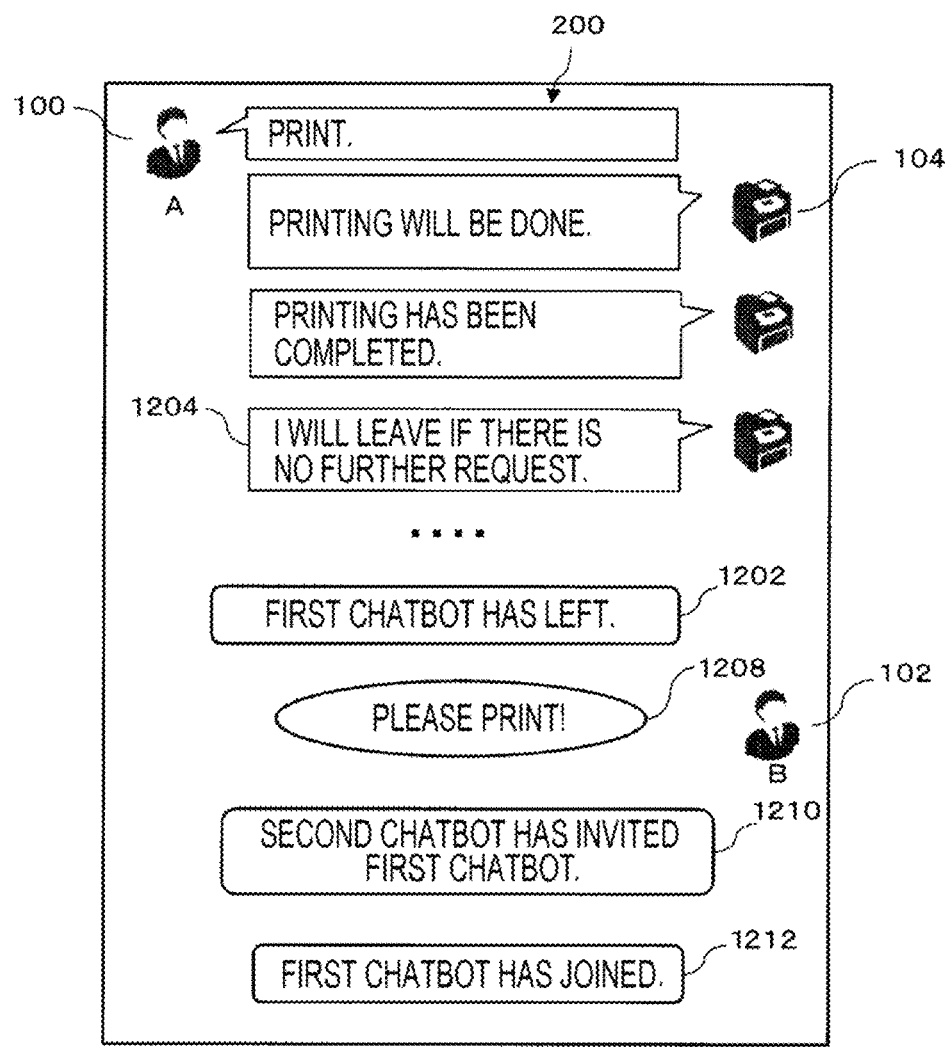
FIG. 28 is an explanatory diagram of a user terminal screen according to a ninth exemplary embodiment.

FIG. 28 is an example of a screen displayed on the display unit of user terminal A according to the present exemplary embodiment.

The user A operates the user terminal A to transmit a message "Print" to the chatbot. The user A also attaches image data to be printed along with the message. The user A may only transmit the image data instead of the message.

The chatbot that receives the message analyzes the contents of the message and interprets the contents of the message as a printing instruction, creates a message that "Printing will be done." to make an automatic response, and drives the printer A or the printer B in accordance with the setting information of the user A to execute the printing service. When the printing is completed, the chatbot confirms a completion notification from the printer A or the printer B and then creates a message that "Printing has been completed" to make an automatic response.

Then, after executing the printing service, the chatbot notify a leaving schedule by creating a message 1204 that "I will leave if there is no further request" and responding, and transitions to a standby state for the predetermined period of time. The predetermined period of time may be set to, for example, 3 minutes. It should be noted that the predetermined period of time is not limited to 3 minutes.

When there is no specific message from the user within the predetermined period of time, the first chatbot leaves after the elapse of the predetermined period of time and transmits the message 1202 that "The first chatbot has left."

When the first chatbot has left, the second chatbot becomes in the operating state accordingly, receives messages from the user, and analyzes the contents of the messages. Then, when receiving a sticker 1208 that "Please print!" from the user A, the second chatbot analyzes the contents of the sticker 1208, determines that the sticker 1208 matches a specific sticker, automatically invites the first chatbot using the account of the first chatbot which is stored in advance, and transmits a message 1210 that "The second chatbot has invited the first chatbot." In addition, when the first chatbot transitions to the entry (join) state, a message 1212 that "The first chatbot has joined." is transmitted.

Figure 29:
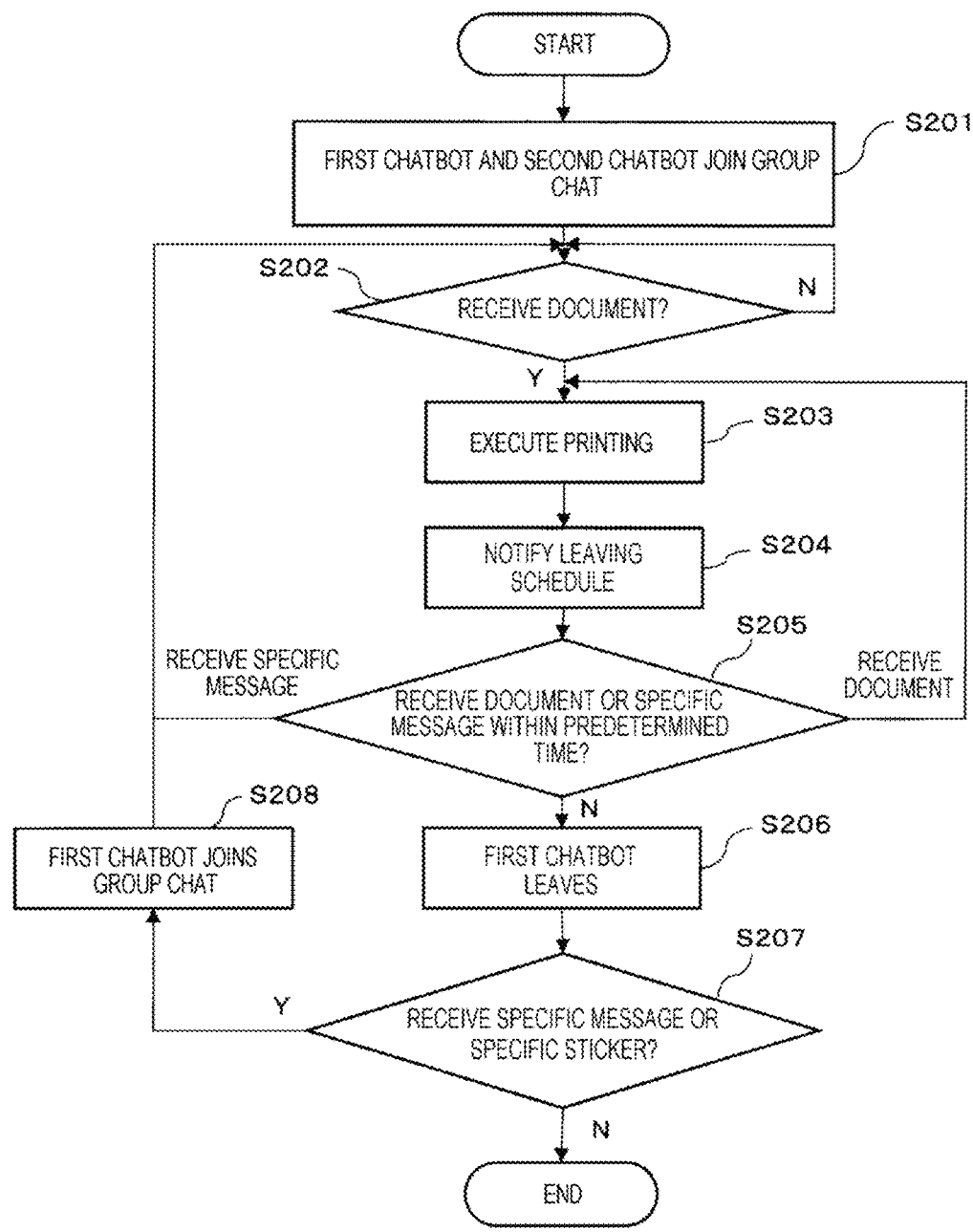
FIG. 29 is a process flowchart according to the ninth exemplary embodiment.

FIG. 29 illustrates a process flowchart of the chatbots according to the present exemplary embodiment.

In response to an invitation operation performed by a participating member of a group chat, for example, the user A, the first chatbot and the second chatbot join the group chat, and the first chatbot transitions to the operating state (S201). While joining the group chat, the second chatbot transitions to the non-operating state. In the operating state, the message receiving unit 161 receives messages and sequentially stores the messages in the message storage unit 167, and the content analyzing unit 162 analyzes the contents of the messages and outputs analysis results to the operation controller 163. When the contents of the message is the printing instruction, the operation controller 163 executes the printing service by driving the printers A and B. In addition, the response message creating unit 164 creates a message in accordance with the message from the user and transmits the created message. It is assumed that before joining the group chat, the user A and the user B have added the first chatbots as friends and obtained the chatbot use authorities. When the first chatbot is added as a friend, the second chatbot is automatically added as a friend and the second chatbot use authority is given.

When the first chatbot joins the group chat, the first chatbot receives a message from the user, and determines whether the message is the printing instruction, that is, whether a document that is image data to be printed is included therein (S202).

When receiving the document ("YES" in S202), the first chatbot executes the printing service in response to the printing instruction (S203). Then, the first chatbot informs the leaving schedule by transmitting a message that "I will leave if there is no further request" (S204) and transitions to the standby state for the predetermined period of time. The predetermined period of time is, for example, 3 minutes.

Then, it is determined whether the document or the specific message is received within the predetermined period of time (S205). When the predetermined period of time has elapsed without receiving the document or the specific message ("NO" in S205), the first chatbot automatically leaves the group chat and transitions to the non-operating state. At this time, the second chatbot maintains the join state and transitions from the non-operating state to the operating state in response to the first chatbot transitioning to the non-operating state. The message receiving unit 161 receives messages and sequentially stores the messages in the message storage unit 167, the content analyzing unit 162 analyzes the contents of the messages, and the response message creating unit 164 creates messages in accordance with the messages from the user and transmits the messages. It should be noted that the operation controller 163 of the second chatbot does not execute the printing service.

On the other hand, when the document is received within the predetermined period of time, the first chatbot releases the standby state and maintains the operating state as it is. Then, the process proceeds to S203 to execute the printing service of the document. Also, when a specific message is received within the predetermined period of time, the standby state is released and the operating state is maintained as it is. Then, the process proceeds to S202 to determine whether the document is received.

When a specific message or a specific sticker such as "Please print!" is received from the user after the first chatbot has left, the second chatbot in the operating state analyzes the contents of the sticker, determines that the received sticker matches a specific sticker, automatically invites the first chatbot to the group chat using the account of the first chatbot that is stored in advance (that is, invites the first chatbot without an explicit instruction from the user), and causes the first chatbot to transition from the non-operating state to the operating state again.

In this manner, the second chatbot is caused to join the group chat together with the first chatbot, and the second chatbot automatically invites the first chatbot after the first chatbot has left. Thereby, the effort of manually causing the first chatbot to join the group chat again is eliminated. The second chatbot may be regarded as a software robot program that does not have a function of executing the printing service but operates in the background of the first chatbot.

The second chatbot transitions to the operating state after the first chatbot has left, receives messages from the user, and sequentially stores the messages in the message storage unit 167 as history. Therefore, after the first chatbot re-enters (rejoins) the group chat and transitions to the first operation mode, it is possible to print messages and image data during a period in which the second chatbot receives, in a retroactive manner.

In addition, after the first chatbot has left, the second chatbot transitions to the operating state, receives messages from the user, and sequentially stores the messages in the message storage unit 167 as history. Alternatively, from the viewpoint of the security or privacy protection, the second chatbot may store not all messages, but only a specific message, for example, a relatively new message or image data within a predetermined time from the leaving timing. With this configuration, it may be possible to print the relatively new message or image data even after the first chatbot re-enters and transitions to the operating state. Relatively old messages or image data within the predetermined time from the leaving timing are not stored. Thereby, the security is ensured or the privacy is protected. Only single newest message may be used as a relatively new message within the predetermined time from the leaving timing.

The exemplary embodiments of the present invention have been described above. It should be noted that the present disclosure is not limited to these exemplary embodiments, and various modifications may be made. Hereinafter, the modifications will be described.

<Modification 1>

In the first to fifth exemplary embodiments, the first mode is set to an "active mode" and the second mode is set to a "quiet mode." Alternatively, a state in which the chatbot operates in the first mode may be referred to as a high-functioning chatbot, and a state in which the chatbot operates in the second mode may be referred to as a low-functioning chatbot.

In addition to the first mode and the second mode, three or more modes such as a third mode, a fourth mode, and the like may be provided in the first to fifth exemplary embodiments. For example, functions are divided into a high-function chatbot, a medium-function chatbot, and a low-function chatbot as follows:

High-functioning chatbot: execute the printing service in accordance with a printing instruction from any user.

Medium-functioning chatbot: execute the printing service in accordance with a printing instruction from a specific user.

Low-functioning chatbot: do not execute the printing service in accordance with a printing instructions from any user.

The medium-functioning chatbot extracts a user ID included in a message or a sticker from the user, and executes the printing service in accordance with the printing instruction when the user ID matches a specific user ID. Switching among the high-functioning chatbot, the medium-functioning chatbot, and the low-functioning chatbot may be performed in response to the specific message or specific sticker as in the exemplary embodiments. For example, switching from the high-functioning chatbot to the medium-functioning chatbot is performed in response to a sticker "Restrict printing!". Switching from the medium-functioning chatbot to the high-functioning chatbot is performed in response to a sticker "Release printing restriction!".

<Modification 2>

In the first to fifth exemplary embodiments, switching between the first mode and the second mode is performed in accordance with the specific message or the specific sticker from the user. Alternatively, switching between the first mode and the second mode may be performed in accordance with the specific message or the specific sticker from a specific user.

Specifically, when the user A invites the chatbot to a group chat, switching between the first mode and the second mode is performed in response to transmission of the specific message or specific sticker from the user A. Alternatively, the first mode is switched to the second mode in accordance with a first specific message or a first specific sticker, and the second mode is switched to the first mode in accordance with a second message or a second specific sticker from a user who has transmitted the first specific message or first specific sticker. Even if other users transmit the second specific message or second specific sticker, the second mode is not switched to the first mode but the second mode is maintained as it is.

<Modification 3>

In the sixth exemplary embodiment, the chatbot leaves the group chat after executing the printing service. Even after leaving the group chat, the chatbot may maintain information which indicates that the chatbot has been added as a friend and which is stored in the user information storage unit 165, as it is. This eliminates the need to perform an operation of adding the chatbot as a friend again after the chatbot rejoins the group chat. Similarly, even after leaving the group chat, the chatbot may maintain the setting information for each user stored in the setting information storage unit 166 as it is. This eliminates the need to register the setting information again after the chatbot rejoins the group chat.

<Modification 4>

In the first to ninth exemplary embodiments, the descriptions have been made on the example in which the chatbot that provides the printing service in accordance with the message from the user. It should be noted that the chatbot may provide any other services. Examples of the service are as follows.

Searching service for music, news articles, lodging facilities, books, cooking recipes, etc.

Ticket reservation service

Exhibiting/searching/trading contact services for free markets

Translation service to another language

Figure 20:
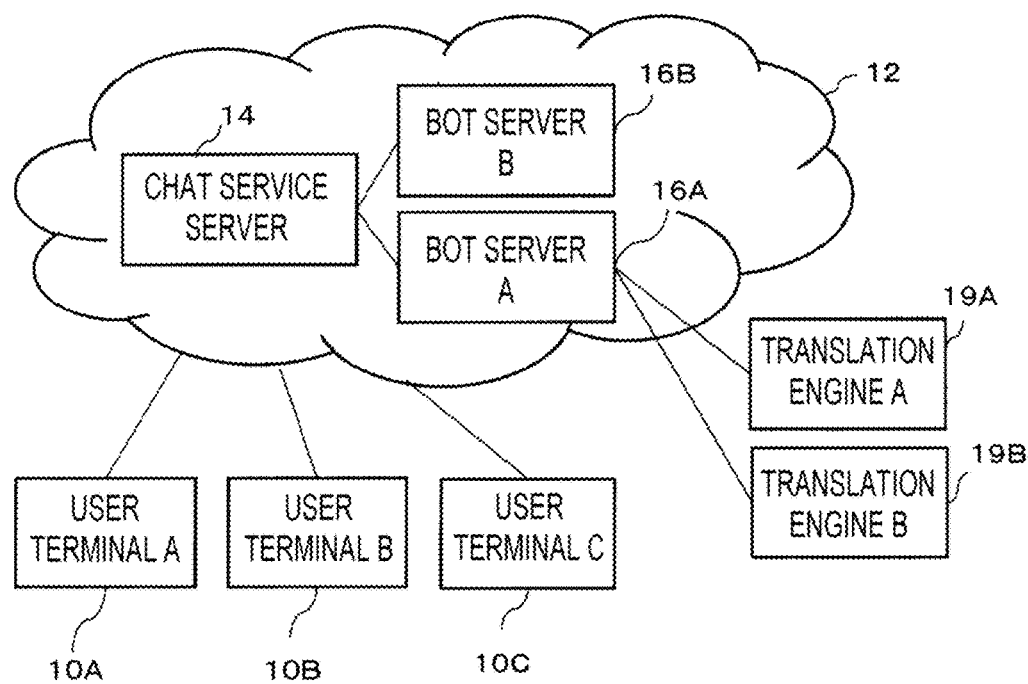
FIG. 20 is a system configuration diagram according to a modification.

FIG. 20 illustrates a system configuration diagram when the translation service is executed. Unlike FIG. 1, a translation engine A (19A) and a translation engine B (19B) are provided instead of the printer A (18A) and the printer B (18B). The translation engine A is a software robot program that translates Japanese into English. The translation engine B is a software robot program that translates Japanese into Chinese.

The user A selects the translation engine A, and sets and registers such a format that the original Japanese is displayed following an English translation, as the setting information. Accordingly, when the user A transmits a message of "今日は空いていますか？" to the chatbot in Japanese which means "Are you free today?" in English, the chatbot drives the translation engine A to automatically respond to the message by transmitting messages "Are you free today?" "今日は空いていますか？".

The chatbot may leave the group chat after executing the translation service.

In addition, when the chatbot executes the translation service by unnecessarily responding without complying with the user's intention, the user may switch the chatbot from the first mode to the second mode by transmitting the specific message or specific sticker. For example, the first mode may be switched to the second mode by transmitting a sticker that "Stop translating!". Also, the second mode may be switched to the first mode by transmitting a sticker that "Please translate!"

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A message providing device comprising:
a receiver; and
a controller including a processor, wherein
at least a first operation mode and a second operation mode are provided as operations of a software robot program, the software robot program operating on a messaging service in which a message is exchanged between users, the software robot program exchanging a message with a user,
in the first operation mode, a specific service is executed upon reception of a message or a sticker,
in the second operation mode, the specific service is not executed even if the message or the sticker is received,
the receiver receives the message or the sticker from the user, when the received message is a first specific message or the received sticker is a first specific sticker, the controller switches the first operation mode to the second operation mode, and when the received message is a second specific message which is different from the first specific message or the received sticker is a second specific sticker which is different from the first specific sticker, the controller switches the second operation mode to the first operation mode.

2. The message providing device according to claim 1, further comprising:

a storage unit including memory that stores the message, the sticker, or print data received from the user, wherein in the second operation mode, the message, the sticker, or the print data is received from the user and stored in the storage unit, and after the second operation mode is switched to the first operation mode, the software robot program executes the specific service or notifies the user whether to execute the specific service, in accordance with the message, the sticker, or the print data received during the second operation mode and stored in the storage unit.

3. The message providing device according to claim 1, wherein in the second operation mode, the specific service is not executed even if a service requesting message or a service requesting sticker is received from the user, and when the specific service is not executed in the second operation mode, the user is notified that a current operation mode is the second operation mode.

4. The message providing device according to claim 1, wherein in the second operation mode, when a service requesting message or a service requesting sticker is received from the user a predetermined number of times, the user is notified that a current operation mode is the second operation mode.

5. The message providing device according to claim 1, wherein in the second operation mode, (i) when a transition timing from the first operation mode to the second operation mode is earlier than a predetermined time or (ii) when the number of messages after the transition timing exceeds a predetermined number, the user is notified that a current operation mode is the second operation mode.

6. The message providing device according to claim 1, wherein the software robot program includes a first software robot program that executes the specific service upon receipt of the message or the sticker, and a second software robot program that does not execute the specific service even if receiving the message or the sticker, in the first operation mode, the first software robot program operates, in the second operation mode, the second software robot program operates, when the received message is the first specific message or the received sticker is the first specific sticker, the first software robot program enters a non-operating state and the second software robot program operates, and when the received message is the second specific message or the received sticker is the second specific sticker, the first software robot program operates.

7. The message providing device according to claim 1, wherein the software robot program includes a first software robot program that executes the specific service upon receipt of the message or the sticker, and a second software robot program that does not execute the specific service even if receiving the message or the sticker, in the first operation mode, the first software robot program operates, in the second operation mode, the second software robot program operates, when the specific service is executed in accordance with the received message or the received sticker, the first software robot program enters a non-operating state and the second software robot program operates, and when the received message is the second specific message or the received sticker is the second specific sticker, the first software robot program operates.

8. The message providing device according to claim 1, wherein the software robot program includes a first software robot program that executes the specific service upon receipt of the message or the sticker, and a second software robot program that does not execute the specific service even if receiving the message or the sticker, in the first operation mode, the first software robot program operates, in the second operation mode, the second software robot program operates, the message providing device further comprising:

a storage unit that stores the message or the sticker received from the user, wherein in the first operation mode, the first software robot program receives the message or the sticker from the user and stores the received message or the received sticker in the storage unit, and in the second operation mode, the second software robot program receives the message or the sticker from the user and stores the received message or the received sticker in the storage unit.

9. The message providing device according to claim 1, wherein the software robot program includes a first software robot program that executes the specific service upon receipt of the message or the sticker, and a second software robot program that does not execute the specific service even if receiving the message or the sticker, in the first operation mode, the first software robot program operates, in the second operation mode, the second software robot program operates, and the second software robot program operates together with the first software robot program in accordance with a user's operation of inviting the first software robot program when operating on the messaging service in which the message is exchanged between the users.

10. The message providing device according to claim 9, wherein in the first operation mode, the first software robot program operates and the second software robot program enters a non-operating state, and in the second operation mode, the first software robot program enters the non-operating state and the second software robot program operates.

11. A non-transitory computer readable medium storing a program that causes a computer to operate as: a receiver; and a controller, wherein at least a first operation mode and a second operation mode are provided as operations of a software robot program, the software robot program operating on a messaging service in which a message is exchanged between users, the software robot program exchanging a message with a user, in the first operation mode, a specific service is executed upon reception of a message or a sticker, in the second operation mode, the specific service is not executed even if the message or the sticker is received, the receiver receives the message or the sticker from the user, when the received message is a first specific message or the received sticker is a first specific sticker, the controller switches the first operation mode to the second operation mode, and when the received message is a second specific message which is different from the first specific message or the received sticker is a second specific sticker which is different from the first specific sticker, the controller switches the second operation mode to the first operation mode.

* * * * *